(12) United States Patent
Zou et al.

(10) Patent No.: US 12,542,888 B2
(45) Date of Patent: Feb. 3, 2026

(54) IMAGING METHOD AND DISPLAY APPARATUS

(71) Applicant: Shenzhen Yinwang Intelligent Technologies Co., Ltd., Shenzhen (CN)

(72) Inventors: Bing Zou, Shenzhen (CN); Xiao Li, Dongguan (CN); Lei Mao, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 18/400,859

(22) Filed: Dec. 29, 2023

(65) Prior Publication Data

US 2024/0137479 A1  Apr. 25, 2024
US 2024/0236286 A9  Jul. 11, 2024

Related U.S. Application Data

(63) Continuation of application No. PCT/CN2022/097316, filed on Jun. 7, 2022.

(30) Foreign Application Priority Data

Jun. 30, 2021  (CN) .......................... 202110745703.7

(51) Int. Cl.
*H04N 13/31* (2018.01)
*G02B 30/30* (2020.01)
*G02B 30/35* (2020.01)
*H04N 13/32* (2018.01)

(52) U.S. Cl.
CPC ............. *H04N 13/31* (2018.05); *G02B 30/30* (2020.01); *G02B 30/35* (2020.01); *H04N 13/32* (2018.05)

(58) Field of Classification Search
CPC .... H04N 13/31; H04N 13/32; H04N 2013/40; G02B 27/0101; G02B 30/30; G02B 30/35
USPC ............................................................. 348/51
See application file for complete search history.

(56) References Cited

U.S. PATENT DOCUMENTS

| | | | |
|---|---|---|---|
| 9,674,510 B2 | 6/2017 | Aiden et al. | |
| 2014/0139652 A1* | 5/2014 | Aiden ................. | H04N 13/305 348/54 |
| 2015/0077645 A1 | 3/2015 | Lin | |
| 2017/0272735 A1* | 9/2017 | Aiden ................. | H04N 13/302 |
| 2020/0156471 A1* | 5/2020 | Lee ....................... | B60K 35/81 |

FOREIGN PATENT DOCUMENTS

| | | | | |
|---|---|---|---|---|
| CN | 103135233 A | | 6/2013 | |
| CN | 104460196 A | | 3/2015 | |
| CN | 102483605 B | * | 9/2015 | ............ G02B 27/22 |
| CN | 109799616 A | | 5/2019 | |
| WO | WO-2020167263 A1 | * | 8/2020 | ............ B60K 35/00 |

* cited by examiner

*Primary Examiner* — Behrooz M Senfi
(74) *Attorney, Agent, or Firm* — Conley Rose, P.C.

(57) ABSTRACT

In an imaging method, an image source transmits N image source light beams to a light beam deflector in K periodicities, where N is a positive integer greater than or equal to 2, and K is a positive integer greater than or equal to 1. The light beam deflector deflects transmission directions of the N image source light beams to a plurality of viewing areas, where the N image source light beams transmitted to the plurality of viewing areas are respectively imaged in a plurality of display areas.

20 Claims, 10 Drawing Sheets

US 12,542,888 B2

IMAGING METHOD AND DISPLAY APPARATUS

CROSS-REFERENCE TO RELATED APPLICATIONS

This application is a continuation of International Patent Application No. PCT/CN2022/097316 filed on Jun. 7, 2022, which claims priority to Chinese Patent Application No. 202110745703.7 filed on Jun. 30, 2021. The disclosures of the aforementioned applications are hereby incorporated by reference in their entireties.

TECHNICAL FIELD

The present disclosure relates to the field of virtual imaging technologies, and in particular, to an imaging method and a display apparatus.

BACKGROUND

Imaging in a current display imaging field may be implemented based on a virtual imaging technology. For a display apparatus that can implement the virtual imaging technology, refer to FIG. 1. The display apparatus includes an image source 101 and a lens 102. The image source 101 is located on a right side of the lens 102, and the image source 101 is located within one focal length of the lens 102. A light beam emitted by the image source 101 forms an inverted virtual image in a display area 103 on a left side of the lens 102. A viewer can view the virtual image formed in the display area 103 in a viewing area 104. If the viewer is located outside the viewing area 104, the viewer fails to view the virtual image formed in the display area 103.

A size of the viewing area 104 is positively correlated with an aperture of the lens 102. To be specific, a larger aperture of the lens 102 indicates a larger viewing area 104. It can be learned that, to increase the viewing area 104, the aperture of the lens 102 may be increased.

However, increasing the aperture of the lens 102 increases a volume of the display apparatus, so that a requirement for space occupied by the display apparatus is increased. In a scenario in which the volume of the display apparatus cannot be increased, the size of the viewing area of the display apparatus cannot be increased.

SUMMARY

Embodiments of the present disclosure provide an imaging method and a display apparatus that can increase, without increasing a volume of the display apparatus, a viewing area in which an image formed by the display apparatus can be viewed.

According to a first aspect, an embodiment of the present disclosure provides an imaging method, where the method is applied to a display apparatus, the display apparatus includes an image source module and a light beam deflection module, and the method includes: The image source module transmits N image source light beams to the light beam deflection module in K periodicities, where N is a positive integer greater than or equal to 2, and K is a positive integer greater than or equal to 1. The light beam deflection module deflects transmission directions of the N image source light beams to a plurality of viewing areas, where the N image source light beams transmitted to the plurality of viewing areas are respectively imaged in a plurality of display areas.

It can be learned that the light beam deflection module can deflect the image source light beams to the plurality of different viewing areas in the K different periodicities. Viewers located in the plurality of different viewing areas can view imaging in the plurality of display areas. It can be learned that the display apparatus includes the plurality of viewing areas, so that a quantity of viewing areas is increased effectively. When a volume of the display apparatus is not increased, a viewing area of a viewing image source is expanded by increasing the quantity of viewing areas. Because the volume of the display apparatus does not need to be increased, space occupied by the display apparatus is reduced, and a space requirement of the display apparatus is reduced. The viewers may view imaging of the display apparatus in the plurality of display areas in the plurality of different viewing areas. It can be learned that the display apparatus can support simultaneous viewing by a plurality of viewers.

Based on the first aspect, in an optional implementation, K is equal to N. When K is equal to N, in the N image source light beams output by the image source module, different image source light beams are transmitted in different periodicities; and in the N image source light beams output by the light beam deflection module, transmission directions of different image source light beams are deflected in different periodicities, and different image source light beams are transmitted to different viewing areas in different periodicities.

Based on the first aspect, in an optional implementation, K is greater than N. When K is greater than N, no image source light beam is transmitted in one or more periodicities included in the K periodicities.

Based on the first aspect, in an optional implementation, K is less than N. When K is less than N, the K periodicities include at least one periodicity for transmitting a plurality of image source light beams.

Based on the first aspect, in an optional implementation, that the light beam deflection module deflects transmission directions of the N image source light beams to a plurality of viewing areas includes: The light beam deflection module obtains a plurality of deflection states; and the light beam deflection module transmits the N image source light beams to the plurality of viewing areas, where in the K periodicities, the light beam deflection module is in different deflection states in different periodicities.

It can be learned that the display apparatus can control the light beam deflection module based on the plurality of deflection states, to ensure that the light beam deflection module in the plurality of deflection states transmits the N image source light beams to a plurality of imaging areas. This effectively ensures that a plurality of viewers can successfully view the imaging in the plurality of display areas.

Based on the first aspect, in an optional implementation, the display apparatus further includes a detection module and a processing unit that are connected to each other, and before that the light beam deflection module deflects transmission directions of the N image source light beams to a plurality of viewing areas, the method further includes: The detection module detects M coordinates of M viewers, where M is a positive integer greater than or equal to N; the processing unit determines the plurality of deflection states based on the M coordinates; and the processing unit sends the plurality of deflection states to the light beam deflection module.

It can be learned that the display apparatus can determine corresponding viewing areas based on the M coordinates of the M viewers. To be specific, the light beam deflection module can determine the transmission directions of the image source light beams based on the M coordinates of the M viewers, to ensure that the M viewers can view, in the plurality of viewing areas, images formed in the plurality of display areas. In addition, the display apparatus determines the corresponding viewing areas based on the M coordinates of the M viewers. This effectively ensures that all the M viewers can successfully view the imaging in the plurality of display areas.

Based on the first aspect, in an optional implementation, the display apparatus further includes a detection module, the detection module is connected to the light beam deflection module, and before that the light beam deflection module deflects transmission directions of the N image source light beams to a plurality of viewing areas, the method further includes: The detection module detects M coordinates of M viewers, where M is a positive integer greater than or equal to N; and the light beam deflection module determines the plurality of deflection states based on the M coordinates.

Based on the first aspect, in an optional implementation, the display apparatus further includes a processing unit, the processing unit is separately connected to the light beam deflection module and the image source module, and the method further includes: The processing unit synchronously sends an indication message to the image source module and the light beam deflection module, where the indication message indicates the K periodicities.

Based on the first aspect, in an optional implementation, before that the image source module transmits N image source light beams to the light beam deflection module, the method further includes: The light beam deflection module sends an indication message to the image source module, where the indication message indicates the light beam deflection module and the image source module to process a same image source light beam in a same periodicity.

Based on the first aspect, in an optional implementation, before that the image source module transmits N image source light beams to the light beam deflection module, the method further includes: The image source module sends an indication message to the light beam deflection module, where the indication message indicates the light beam deflection module and the image source module to process a same image source light beam in a same periodicity.

For example, for an $i^{th}$ image source light beam of the N image source light beams, the indication message indicates the image source module to generate and emit the $i^{th}$ image source light beam in an $i^{th}$ periodicity of the K periodicities. The indication message further indicates the light beam deflection module to deflect a transmission direction of the $i^{th}$ image source light beam in the same $i^{th}$ periodicity.

Based on the first aspect, in an optional implementation, the indication message includes K consecutive different signal levels, and the K different signal levels respectively correspond to the K periodicities.

Based on the first aspect, in an optional implementation, the indication message includes K consecutive bit sets, each bit set includes at least one bit, values of different bit sets in the K bit sets are different, and the K bit sets respectively correspond to the K periodicities.

Based on the first aspect, in an optional implementation, the indication message includes K sub-messages, and the K sub-messages respectively indicate start and end moments of the K periodicities.

It can be learned that the indication message can effectively ensure that the image source module and the light beam deflection module synchronously determine the K periodicities, and effectively ensure that the viewer can view imaging in a corresponding display area.

Based on the first aspect, in an optional implementation, the N image source light beams include a left eye image source light beam corresponding to a left eye disparity map and a right eye image source light beam corresponding to a right eye disparity map, and the left eye disparity map and the right eye disparity map correspond to a same three-dimensional image source. A plurality of viewing positions includes a left eye position corresponding to the left eye image source light beam and a right eye position corresponding to the right eye image source light beam, and the left eye position and the right eye position respectively correspond to a left eye and a right eye of a same viewer.

It can be learned that a left eye imaging area included in an imaging module corresponds to the left eye position, and a right eye imaging area included in the imaging module corresponds to the right eye position. The left eye imaging area of the imaging module transmits the left eye image source light beam to the left eye position, and the right eye imaging area of the imaging module transmits the right eye image source light beam to the right eye position. It can be learned that the left eye image source light beam output by the light beam deflection module in a first periodicity can be imaged in a left eye display area, and the right eye image source light beam output by the light beam deflection module in a second periodicity can be imaged in a right eye display area. The left eye of the viewer can view, in the left eye display area, a virtual image formed by the left eye image source light beam, and the right eye of the viewer can view, in the right eye display area, a virtual image formed by the right eye image source light beam. The viewer can view a three-dimensional image based on the virtual image formed in the left eye position and the virtual image formed in the right eye position. It can be learned that the display apparatus can implement three-dimensional imaging based on a virtual imaging technology.

Based on the first aspect, in an optional implementation, a frame rate between two image source light beams received in a same viewing area is greater than or equal to a preset value.

It can be learned that, when the frame rate between the two image source light beams received in the same viewing area is greater than or equal to the preset value, the viewer can view continuous image sources in the viewing area. The viewer does not perceive switching between the different image source light beams in the viewing area.

Based on the first aspect, in an optional implementation, the K periodicities are continuous and do not overlap each other on a time axis.

Based on the first aspect, in an optional implementation, duration of at least two periodicities included in the K periodicities partially overlap on a time axis.

According to a second aspect, an embodiment of the present disclosure provides a display apparatus, where the display apparatus includes an image source module and a light beam deflection module, and the light beam deflection module is disposed on transmission optical paths of N image source light beams emitted by the image source module. The image source module is configured to transmit the N image source light beams to the light beam deflection module in K periodicities, where N is a positive integer greater than or equal to 2, and K is a positive integer greater than or equal to 1. The light beam deflection module is configured to deflect transmission directions of the N image source light beams to a plurality of viewing areas, where the N image source light beams transmitted to the plurality of viewing areas are respectively imaged in a plurality of display areas.

For descriptions of beneficial effects shown in this aspect, refer to the foregoing first aspect.

Based on the second aspect, in an optional implementation, K is equal to N. When K is equal to N, in the plurality of image source light beams output by the image source module, different image source light beams are transmitted in different periodicities; and in the plurality of image source light beams output by the light beam deflection module, transmission directions of different image source light beams are deflected in different periodicities, and different image source light beams are transmitted to different viewing areas in different periodicities.

Based on the second aspect, in an optional implementation, K is greater than N. When K is greater than N, no image source light beam is transmitted in one or more periodicities included in the K periodicities.

Based on the second aspect, in an optional implementation, K is less than N. When K is less than N, the K periodicities include at least one periodicity for transmitting a plurality of image source light beams.

Based on the second aspect, in an optional implementation, the display apparatus further includes an imaging module, where a distance between the imaging module and the image source module is less than a focal length of the imaging module.

It can be learned that, when the distance between the imaging module and the image source module is less than the focal length of the imaging module, it can be effectively ensured that the image source light beam can form a virtual image in a display area.

Based on the second aspect, in an optional implementation, the light beam deflection module is further configured to: obtain a plurality of deflection states; and transmit the N image source light beams to the plurality of viewing areas, where in the K periodicities, the light beam deflection module is in different deflection states in different periodicities.

Based on the second aspect, in an optional implementation, the display apparatus further includes a detection module and a processing unit that are connected to each other. The detection module is configured to detect M coordinates of M viewers, where M is a positive integer greater than or equal to N. The processing unit is configured to: determine the plurality of deflection states based on the M coordinates, and send the plurality of deflection states to the light beam deflection module.

Based on the second aspect, in an optional implementation, the display apparatus further includes a detection module, and the detection module is connected to the light beam deflection module. The detection module is configured to detect M coordinates of M viewers, where M is a positive integer greater than or equal to N. The light beam deflection module is further configured to determine the plurality of deflection states based on the M coordinates.

Based on the second aspect, in an optional implementation, the display apparatus further includes a processing unit. The processing unit is separately connected to the light beam deflection module and the image source module, and the processing unit is configured to synchronously send an indication message to the image source module and the light beam deflection module, where the indication message indicates the K periodicities.

Based on the second aspect, in an optional implementation, the light beam deflection module is further configured to send an indication message to the image source module, where the indication message indicates the light beam deflection module and the image source module to process a same image source light beam in a same periodicity.

Based on the second aspect, in an optional implementation, the image source module is further configured to send an indication message to the light beam deflection module, where the indication message indicates the light beam deflection module and the image source module to process a same image source light beam in a same periodicity.

Based on the second aspect, in an optional implementation, the indication message includes K consecutive different signal levels, and the K different signal levels respectively correspond to the K periodicities.

Based on the second aspect, in an optional implementation, the indication message includes K consecutive bit sets, each bit set includes at least one bit, values of different bit sets in the K bit sets are different, and the K bit sets respectively correspond to the K periodicities.

Based on the second aspect, in an optional implementation, the indication message includes K sub-messages, and the K sub-messages respectively indicate start and end moments of the K periodicities.

Based on the second aspect, in an optional implementation, the N image source light beams include a left eye image source light beam corresponding to a left eye disparity map and a right eye image source light beam corresponding to a right eye disparity map, and the left eye disparity map and the right eye disparity map correspond to a same three-dimensional image source. A plurality of viewing positions includes a left eye position corresponding to the left eye image source light beam and a right eye position corresponding to the right eye image source light beam, and the left eye position and the right eye position respectively correspond to a left eye and a right eye of a same viewer.

Based on the second aspect, in an optional implementation, a frame rate between two image source light beams received in a same viewing area is greater than or equal to a preset value.

Based on the second aspect, in an optional implementation, the K periodicities are continuous and do not overlap each other on a time axis.

Based on the second aspect, in an optional implementation, duration of at least two periodicities included in the K periodicities partially overlap on a time axis.

DESCRIPTION OF EMBODIMENTS

The following clearly and describes the technical solutions in embodiments of the present disclosure with reference to the accompanying drawings in embodiments of the present disclosure. It is clear that the described embodiments are merely a part rather than all of embodiments of the present disclosure. All other embodiments obtained by persons skilled in the art based on embodiments of the present disclosure without creative efforts shall fall within the protection scope of the present disclosure.

The present disclosure provides a display apparatus that is implemented based on a virtual imaging technology. An image formed by the display apparatus can be directly viewed by human eyes, to break through a constraint of a screen. These technologies can be applied to a portable display apparatus, a home theater, conference presentation, film screening, outdoor displaying, car head-up display (HUD), and the like. The display apparatus shown in the present disclosure may form an image in a display area, so that a viewer can view, in a viewing area, the image formed in the display area. The display apparatus provided in the present disclosure can increase the viewing area without increasing a volume of the display apparatus, so that the viewer can view, based on the display apparatus, the image formed in the display area in a larger viewing area. The following describes a structure of the display apparatus and a process of performing an imaging method by the display apparatus with reference to the embodiments.

Embodiment 1

Figure 2A:
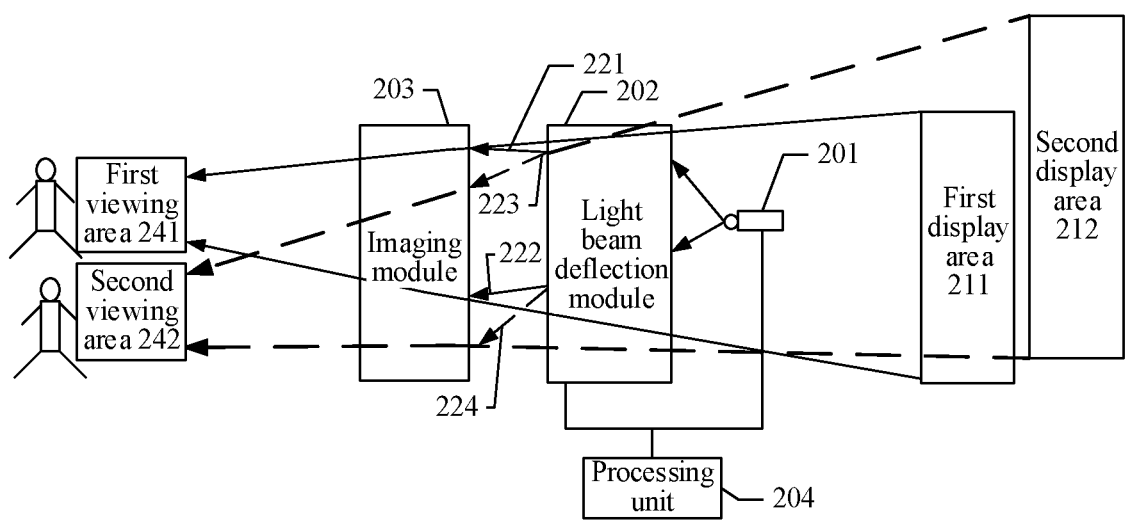
FIG. 2A is an example diagram of a structure of a first embodiment of a display apparatus according to the present disclosure.

For a structure of a display apparatus shown in this embodiment, refer to FIG. 2A. FIG. 2A is an example diagram of a structure of a first embodiment of a display apparatus according to the present disclosure.

The display apparatus shown in this embodiment includes an image source module 201, a light beam deflection module 202, and an imaging module 203, where the image source module 201 is configured to emit an image source light beam. The light beam deflection module 202 and the imaging module 203 are sequentially disposed on a transmission optical path of the image source light beam. The display apparatus further includes a processing unit 204, where the processing unit 204 is separately connected to the light beam deflection module 202 and the image source module 201.

The image source module 201 shown in this embodiment is configured to generate an image source light beam that can be displayed based on a virtual imaging technology. Specifically, the image source module 201 obtains a to-be-displayed image source, and generates an image source light beam corresponding to the image source, where the image source may be a picture or a video.

A specific type of the image source module 201 is not limited in this embodiment. For example, the image source module 201 shown in this embodiment may be a liquid-crystal display (LCD), an organic light-emitting diode (OLED) display, a projector, or the like. Optionally, the image source module 201 shown in this embodiment may include an external interface. The image source module 201 receives an image source from a terminal device through the external interface. The external interface of the display apparatus is connected to the terminal device. The external interface may be an external bus interface, a front-side bus, a display interface, a video display interface, a graphics interface, or the like. The video display interface may be a digital visual interface (DVI), a high-definition multimedia interface (HDMI), (VGA), or the like. Optionally, the image source module 201 shown in this embodiment may include an internal interface. The internal interface of the image source module 201 is connected to the processing unit 204, and the image source module 201 receives an image source from the processing unit 204 through the internal interface. The internal interface may be a bus, a local input/output port (I/O) bus, a hub interface bus, or the like.

A type of the processing unit 204 is not limited in this embodiment. For example, the processing unit 204 may be one or more field-programmable gate arrays (FPGAs), application specific integrated circuits (ASICs), system on chips (SoCs), central processing units (CPUs), network processors (NPs), digital signal processors (DSPs), microcontroller units (MCUs), programmable controllers (PLDs), other integrated chips, any combination of the foregoing chips or processors, or the like. In addition, the processing unit 204 may further include a crystal oscillator configured to generate an indication message (for example, a timing signal).

The light beam deflection module 202 shown in this embodiment is configured to receive the image source light beam from the image source module 201. The light beam deflection module 202 shown in this embodiment is configured to: deflect a transmission direction of the image source light beam, to ensure that the image source light beam output by the light beam deflection module 202 can be transmitted to different imaging areas of the imaging module 203. It can be learned that the light beam deflection module 202 shown in this embodiment has a capability of deflecting the transmission direction of the image source light beam. The light beam deflection module 202 shown in this embodiment may be implemented based on technologies such as a tunable liquid crystal grating, a tunable phase modulator, an optical deflector an optical switch, a liquid crystal on silicon (LCOS), and a liquid crystal array, and is not specifically limited in this embodiment.

Figures 3A, 3B:
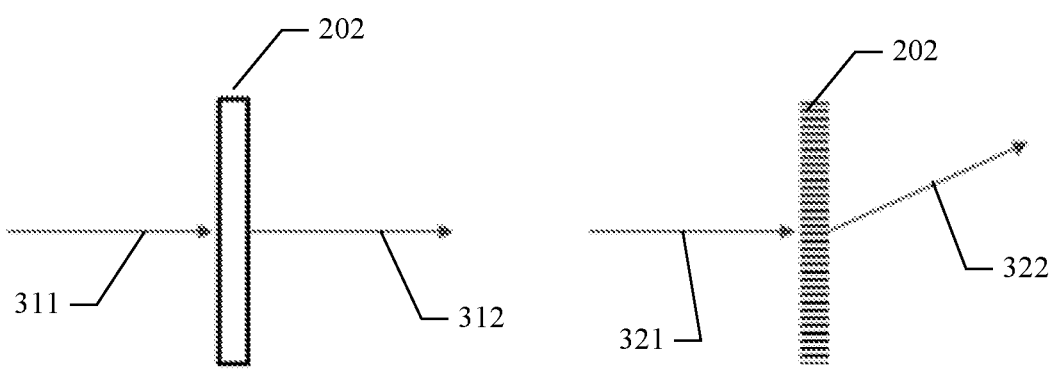
FIG. 3A is an example diagram in which no power is supplied to a light beam deflection module according to the present disclosure.
FIG. 3B is an example diagram in which power is supplied to a light beam deflection module according to the present disclosure.

For example, as shown in FIG. 3A, FIG. 3A is an example diagram in which no power is supplied to a light beam deflection module according to the present disclosure. In this embodiment, an example in which the light beam deflection module 202 includes the tunable liquid crystal grating is used for description. If the light beam deflection module 202 does not need to deflect the transmission direction of the image source light beam from the image source module 201, the light beam deflection module 202 does not need to be powered. When the light beam deflection module 202 is not powered on, liquid crystals of gratings of the light beam deflection module 202 are all in a same direction. The light beam deflection module 202 receives an image source light beam 311 from the image source module 201, and the image source light beam 311 passes through the light beam deflection module 202 to output an image source light beam 312. The light beam deflection module 202 does not deflect a transmission direction of the image source light beam 311. It can be learned that the transmission direction of the image source light beam 311 is same as a transmission direction of the image source light beam 312. As shown in FIG. 3B, FIG. 3B is an example diagram in which power is supplied to a light beam deflection module according to the present disclosure. If the transmission direction of the image source light beam from the image source module 201 needs to be deflected, the light beam deflection module 202 may be powered. When the light beam deflection module 202 is powered on, the light beam deflection module 202 generates a periodic refractive index profile. An image source light beam 321 from the image source module 201 is incident to the light beam deflection module 202. The light beam deflection module 202 generates a grating-like effect on the image source light beam 321, so that a transmission direction of an image source light beam 322 emitted from the light beam deflection module 202 is clearly different from a transmission direction of the image source light beam 321 incident to the light beam deflection module 202. In this embodiment, current provided for the light beam deflection module may be further controlled, to achieve a purpose of adjusting the transmission direction of the image source light beam 322 emitted from the light beam deflection module 202.

Still as shown in FIG. 2A, the imaging module shown in FIG. 2A may include one or more lenses. A distance between the imaging module 203 and the image source module 201 is less than a focal length of the imaging module 203, to ensure that an image source light beam emitted by the imaging module 203 can form a virtual image in a display area. Because the imaging module 203 is a lens, first image source light beams from the image source module 201, such as a first image source light beam 221 and a first image source light beam 222 (to be specific, as shown by solid lines emitted from the light beam deflection module 202) shown in FIG. 2A, can be transmitted to a first viewing area 241 through a first imaging area of the imaging module 203. One or more viewers can view, in the first viewing area 241, a virtual image formed by the first image source light beam in a first display area 211. The virtual image is an image formed by intersection of reverse extension lines of the first image source light beam in the first display area 211 after the first image source light beam is transmitted by the imaging module. Similarly, second image source light beams from the image source module 201, such as a second image source light beam 223 and a second image source light beam 224 (to be specific, as shown by dashed lines emitted from the light beam deflection module 202) shown in FIG. 2A, can be transmitted to a second viewing area 242 through a second imaging area of the imaging module 203. One or more viewers can view, in the second viewing area 242, a virtual image formed by the second image source light beam in a second display area 212. The virtual image is an image formed by intersection of reverse extension lines of the second image source light beam in the second display area 212 after the second image source light beam is transmitted by the imaging module. Positions of the first imaging area and the second imaging area of the imaging module 203 are at least partially different, to ensure that the first image source light beam emitted from the first imaging area and the second image source light beam emitted from the second imaging area can be imaged in different display areas. In FIG. 2A, an example in which there are two display areas is used. In another example, a quantity of display areas may be any positive integer greater than 2.

Figure 2B:
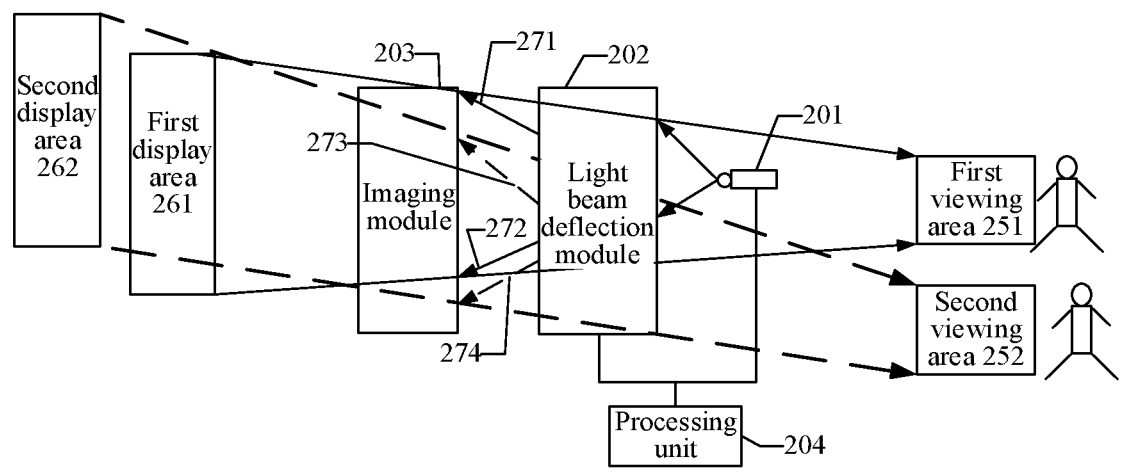
FIG. 2B is an example diagram of a structure of a second embodiment of a display apparatus according to the present disclosure.

Still as shown in FIG. 2B, FIG. 2B is an example diagram of a structure of a second embodiment of a display apparatus according to the present disclosure. An imaging module shown in FIG. 2B may include one or more reflectors. A distance between the imaging module 203 and the image source module 201 is less than a focal length of the imaging module 203, to ensure that an image source light beam emitted by the imaging module 203 can form a virtual image in a display area. Because the imaging module 203 is a reflector, first image source light beams from the image source module 201, such as a first image source light beam 271 and a first image source light beam 272 (to be specific, as shown by solid lines emitted from a light beam deflection module 202) shown in FIG. 2B, can be reflected to a first viewing area 251 through a first imaging area of the imaging module 203. One or more viewers can view, in the first viewing area 251, a virtual image formed by the first image source light beam in a first display area 261. The virtual image is an image formed by intersection of reverse extension lines of the first image source light beam in the first display area 261 after the first image source light beam is reflected by the imaging module. Similarly, second image source light beams from the image source module 201, such as a second image source light beam 273 and a second image source light beam 274 (to be specific, as shown by dashed lines emitted from the light beam deflection module 202) shown in FIG. 2B, can be reflected to a second viewing area 252 through a second imaging area of the imaging module 203. One or more viewers can view, in the second viewing area 252, a virtual image formed by the second image source light beam in a second display area 262. The virtual image is an image formed by intersection of reverse extension lines of the second image source light beam in the second display area 262 after the second image source light beam is reflected by the imaging module. In FIG. 2B, an example in which there are two display areas is used. In another example, a quantity of display areas may be any positive integer greater than 2.

It can be learned that if the imaging module includes one or more lenses (as shown in FIG. 2A), N display areas are located on a first side (a right side as shown in FIG. 2A) of the imaging module 203, and N viewing areas are located on a second side (a left side as shown in FIG. 2A) of the imaging module 203, where N is any positive integer greater than or equal to 2; or if the imaging module includes one or more reflectors (as shown in FIG. 2B), N display areas are located on a second side of the imaging module 203, and N viewing areas are located on a first side of the imaging module 203. The display areas are imaging positions of the imaging module or the display apparatus, and the viewing areas are positions at which the viewers view imaging. The N display areas are in a one-to-one correspondence with the N viewing areas. For example, an image formed in a display area 1 can be viewed in a viewing area 1, and an image formed in a display area 2 can be viewed in a viewing area 2.

It should be noted that, in FIG. 2A and FIG. 2B shown in this embodiment, an example in which an image formed by the display apparatus is a virtual image is used for description, and this is not limited. In another example, the image formed by the display apparatus may alternatively be a real image. In this example, a distance between the imaging module and the image source module is greater than a focal length of the image source module. In this example, the image source light beam output by the imaging module may be directly imaged in the display areas or the viewing areas. The viewers directly view the imaging of the display apparatus in the viewing areas. Optionally, in a scenario in which the display apparatus forms the real image, the display apparatus may not include the imaging module. The image source light beam emitted by the light beam deflection module is deflected directly to the viewing areas, to be imaged in the display areas or the viewing areas.

Figure 4:
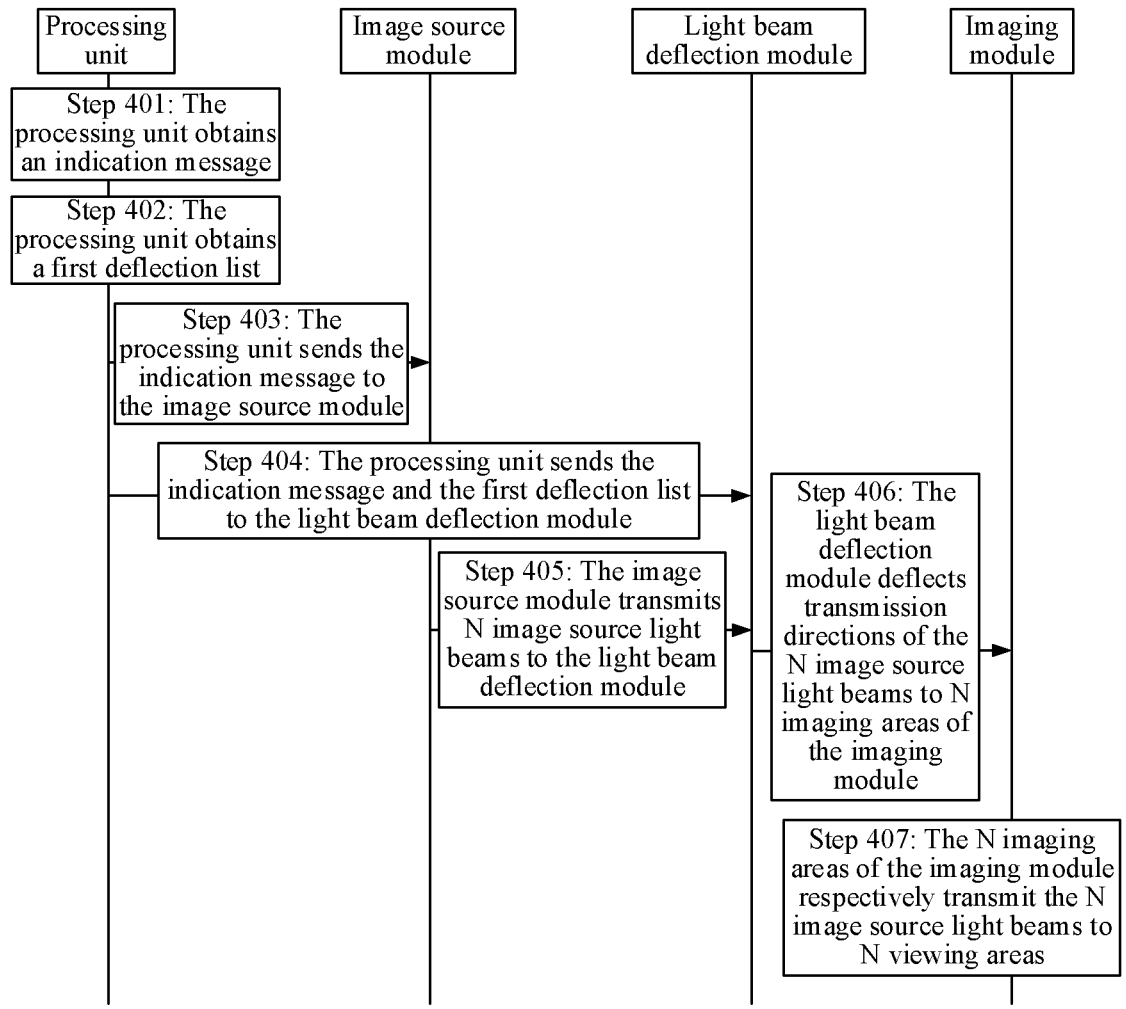
FIG. 4 is a flowchart of steps of a first embodiment of an imaging method according to the present disclosure.

Based on the display apparatus shown in FIG. 2A or FIG. 2B, the following describes an imaging method provided in this embodiment with reference to FIG. 4. FIG. 4 is a flowchart of steps of a first embodiment of an imaging method according to the present disclosure.

Step 401: The processing unit obtains an indication message.

The indication message shown in this embodiment indicates K periodicities, where K is a positive integer greater than or equal to 1. The image source module can transmit N image source light beams to the light beam deflection module separately in the K periodicities based on the indication message. The light beam deflection module can transmit N image source light beams to the imaging module separately in the K periodicities based on the indication message.

The following describes a process in which the processing unit determines the K periodicities.

The processing unit pre-determines a quantity of display areas that require virtual imaging. In this embodiment, an example in which the quantity of display areas is N is used, where N is any positive integer greater than or equal to 2. There are three possibilities of a relationship between values of K and N shown in this embodiment. Possibility 1: K is equal to N; Possibility 2: K is greater than N; and Possibility 3: K is less than N. In this embodiment, an example in which K is equal to N is used for description. It can be learned that the processing unit determines the K periodicities for N display areas. For example, if the processing unit determines that there are two display areas that require the virtual imaging, to be specific, the first display area 211 and the second display area 212 shown in FIG. 2A, the processing unit determines two periodicities. In the two periodicities, a first image source light beam transmitted in a first periodicity is used for imaging in the display area 211, and a second image source light beam transmitted in a second periodicity is used for imaging in the second display area 212. The K periodicities are continuous and do not overlap each other on a time axis. For example, duration of the first periodicity and duration of the second periodicity shown above do not overlap each other. Duration of at least two periodicities included in the K periodicities partially overlap on the time axis. For example, the duration of the first periodicity and the duration of the second periodicity shown above partially overlap on the time axis. In this embodiment, an example in which the K periodicities are continuous and do not overlap each other on the time axis is used for description. Optionally, the processing unit shown in this embodiment may receive a quantity indication message that is input by a viewer through voice, text, touch, and the like. The quantity indication message indicates a quantity of display areas. The processing unit may determine the K periodicities based on the quantity indication message.

When K is equal to N, the processing unit indicates, through an indication message, the image source module to output different image source light beams in different periodicities. The indication message further indicates the light beam deflection module to output different image source light beams along different transmission directions in different periodicities. In another example, if K is greater than N, the indication message indicates that the image source module does not transmit the image source light beams in one or more periodicities in the K periodicities. The indication message further indicates that the light beam deflection module does not transmit the image source light beams in one or more periodicities in the K periodicities. If K is less than N, the indication message indicates the image source module to output a plurality of image source light beams in at least one periodicity of the K periodicities. The indication message further indicates the light beam deflection module to output a plurality of image source light beams in at least one periodicity of the K periodicities.

In this embodiment, an example in which different image source light beams are transmitted in different periodicities when K is equal to N is used for description. In another example, even if K is equal to N, the K periodicities may include one or more periodicities in which no image source light beam is transmitted, and/or the K periodicities may also include at least one periodicity in which a plurality of image source light beams are transmitted.

The following describes several optional manners of how the indication message indicates the K periodicities.

Optional Manner 1:

An indication message shown in this manner may be a timing signal, where the timing signal is a signal, whose horizontal axis is time. In this manner, a time domain feature of the timing signal may indicate the K periodicities. Specifically, the timing signal includes K consecutive different signal levels, where the K different signal levels respectively indicate K different periodicities.

Figure 5A:
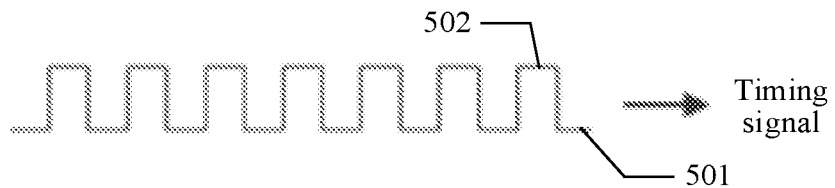
FIG. 5A is an example diagram of an embodiment of an indication message according to the present disclosure.

For example, as shown in FIG. 5A, FIG. 5A is an example diagram of an embodiment of an indication message according to the present disclosure. A timing signal shown in this example includes two consecutive different signal levels. It can be learned that the timing signal shown in FIG. 5A can indicate two different periodicities (for example, the first periodicity and the second periodicity shown above). Specifically, the timing signal includes a low level 501 and a high level 502 that are consecutive, where a period corresponding to the low level 501 is the first periodicity, and a period corresponding to the high level 502 is the second periodicity. The image source module 201 is used as an example. When the image source module 201 receives the timing signal, the image source module 201 outputs a first image source light beam during receiving the low level 501; and the image source module 201 outputs a second image source light beam during receiving the high level 502.

It should be noted that, in this example, an example in which the timing signal has two consecutive different levels is used for description, and this is not limited. In another example, the timing signal may have more than two consecutive different levels. For example, the timing signal may be a four-level pulse-amplitude modulation (PAM4) signal, where the signal has four consecutive different levels. It can be learned that the PAM4 signal can indicate four different periodicities through the four consecutive different levels, to transmit image source light beams to four different display areas.

Optional Manner 2:

An indication message shown in this manner is a bit stream signal including a series of bits. In this manner, the K periodicities may be indicated by using a value of the bit stream signal. Specifically, the indication message includes K consecutive bit sets, each bit set includes at least one bit, and values of different bit sets in the K bit sets are different. The indication message indicates the K different periodicities respectively by using the K consecutive bit sets with different values.

Figure 5B:
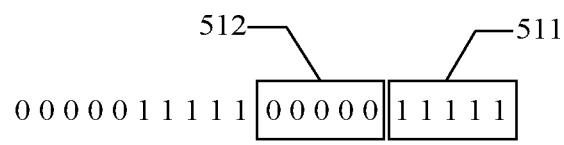
FIG. 5B is an example diagram of another embodiment of an indication message according to the present disclosure.

For example, as shown in FIG. 5B, FIG. 5B is an example diagram of another embodiment of an indication message according to the present disclosure. The indication message shown in this example includes two consecutive bit sets with different values. It can be learned that the indication message shown in FIG. 5B can indicate two different periodicities (for example, the first periodicity and the second periodicity shown above). Specifically, the indication message includes a first bit set 511 and a second bit set 512 that are consecutive, where a period corresponding to the first bit set 511 is the first periodicity, and a period corresponding to the second bit set 512 is the second periodicity. The image source module 201 is used as an example. The image source module 201 outputs a first image source light beam during receiving the first bit set 511; and the image source module 201 outputs a second image source light beam during receiving the second bit set 512.

It should be noted that, in this example, an example in which the first bit set 511 includes five bits whose values are all 1, and the second bit set 512 includes five bits whose values are all 0 is used for description, and this is not limited. In another example, that values of the bit sets indicating different periodicities are different needs to be met.

Optional Manner 3:

An indication message shown in this manner may include K sub-messages. The K sub-messages respectively indicate start and end moments of the K periodicities. For example, the indication message includes two sub-messages, to be specific, a first sub-message and a second sub-message, where the first sub-message indicates start and end moments of a first periodicity, and the start and end moments of the first periodicity are a start moment and an end moment of the first periodicity; and the second sub-signal indicates start and end moments of a second periodicity, and the start and end moments of the second periodicity are a start moment and an end moment of the second periodicity. The image source module 201 is used as an example. The image source module 201 outputs a first image source light beam between the start moment and the end moment indicated by using the first sub-message; and the image source module 201 outputs a second image source light beam between the start moment and the end moment indicated by using the second sub-message.

Step 402: The processing unit obtains a first deflection list.

The first deflection list shown in this embodiment includes a one-to-one correspondence between K different periodicities and K different deflection states. The first deflection list indicates the light beam deflection module to transmit different image source light beams to different imaging areas of the imaging module along different transmission directions in different deflection states in different periodicities. For the first deflection list, refer to the following Table 1:

TABLE 1

| Deflection state | Periodicity |
| --- | --- |
| Deflection state A1 | First periodicity |
| Deflection state A2 | Second periodicity |

If the light beam deflection module is a tunable liquid crystal grating, the different deflection states may be different voltage signals or current signals input to the light beam deflection module. The deflection state is not limited in this embodiment. It can be learned that, in the different periodicities and when the light beam deflection module is in the different deflection states, the image source light beam can be deflected to the different transmission directions. In this way, the image source light beams transmitted in the different periodicities are transmitted to the different viewing areas, to ensure that the image source light beams transmitted in the different periodicities can be imaged in different display areas.

With reference to FIG. 2A, it can be learned that the first image source light beam that needs to be output by the light beam deflection module 202 in the first periodicity can be transmitted to the first viewing area 241. The deflection state A1 corresponding to the first periodicity is determined based on the first deflection list shown in Table 1. The processing unit 204 controls the light beam deflection module 202 to be in the deflection state A1. The light beam deflection module 202 can emit the first image source light beam from the light beam deflection module 202 at a first emergence angle. The first image source light beam emitted from the light beam deflection module 202 at the first emergence angle may be transmitted to a first imaging area of the imaging module 203 along a first transmission direction. The first imaging area of the imaging module 203 can transmit the first image source light beam to the first viewing area 241, and form an inverted virtual image in the first display area 211. For descriptions of the virtual image, refer to FIG. 2A. It can be learned that the viewers can view, in the first display area 211, the virtual image formed by the first image source light beam.

If the second image source light beam needs to be output by the light beam deflection module 202 in the second periodicity, the second image source light beam can be transmitted to the second viewing area 242. The deflection state A2 corresponding to the second periodicity is determined based on the first deflection list shown in Table 1. The processing unit 204 controls the light beam deflection module 202 to be in the deflection state A2. The light beam deflection module 202 can emit the second image source light beam 222 from the light beam deflection module 202 at a second emergence angle. The second image source light beam 222 emitted from the light beam deflection module 202 at the second emergence angle may be transmitted to the second imaging area of the imaging module 203 along a second transmission direction. The second imaging area of the imaging module 203 can transmit the second image source light beam 222 to the second viewing area 242, and form an inverted virtual image in the second display area 212. For descriptions of the virtual image, refer to FIG. 2A. It can be learned that the viewers can view, in the second display area 212, the virtual image formed by the second image source light beam 222. The first emergence angle is different from the second emergence angle, and the first transmission direction is different from the second transmission direction, to ensure that the first image source light beam and the second image source light beam can be transmitted to the first viewing area 241 and the second viewing area 242 respectively. In this way, the virtual images are separately formed in the first display area 211 and the second display area 212.

Step 403: The processing unit sends the indication message to the image source module.

Step 404: The processing unit sends the indication message and the first deflection list to the light beam deflection module.

Specifically, the processing unit synchronously sends the indication message to the image source module and the light beam deflection module, to ensure that the image source module and the light beam deflection module can synchronously determine each periodicity. For example, if the image source module determines that a current moment is in a first periodicity, the light beam deflection module can also determine that the current moment is also in the first periodicity.

It should be noted that in this embodiment, an example in which the processing unit synchronously sends the indication message to the image source module and the light beam deflection module is used for description, and this is not limited. For example, the processing unit may send the indication message to the image source module and the light beam deflection module in a time-sharing manner. If the indication message is the same as that in the foregoing optional manner 3, even if the processing unit sends the indication message to the image source module and the light beam deflection module in the time-sharing manner, the image source module and the light beam deflection module can synchronously determine each periodicity. If the indication message is the same as that in the foregoing optional manner 1 or 2, the processing unit may send a start moment to the image source module and the light beam deflection module. Specifically, when determining that the start moment arrives, the image source module and the light beam deflection module start to determine the K periodicities based on the indication message. For example, with reference to the foregoing optional manner 1, if the start moment is TS, when determining that the current moment is TS, the image source module and the light beam deflection module determine the period corresponding to the low level 501 as the first periodicity, and determine the period corresponding to the high level 502 as the second periodicity, and so on. With reference to the foregoing optional manner 2, if the start moment is TS, when determining that the current moment is TS, the image source module and the light beam deflection module determine the period corresponding to the first bit set 512 as the second periodicity, and determine the period corresponding to the first bit set 512 as the first periodicity, and so on. Based on the indication message shown in this embodiment, the image source module and the light beam deflection module can synchronously determine the K periodicities. In other words, the indication message indicates the light beam deflection module and the image source module to process a same image source light beam in a same periodicity. For example, for an $i^{th}$ image source light beam of N image source light beams, the indication message indicates the image source module to generate and emit the $i^{th}$ image source light beam in an $i^{th}$ periodicity of the K periodicities, and the indication message further indicates the light beam deflection module to deflect a transmission direction of the $i^{th}$ image source light beam in the same $i^{th}$ periodicity, where i is any positive integer greater than or equal to 1 and less than or equal to K.

Specifically, the image source module includes a first processing module, where the first processing module is configured to receive the indication message from the processing unit. The light beam deflection module includes a second processing module, where the second processing module is configured to receive the indication message and the first deflection list from the processing unit. For descriptions of implementations of the first processing module and the second processing module, refer to descriptions of the implementation of the processing unit.

Step 405: The image source module transmits the N image source light beams to the light beam deflection module.

In this embodiment, the image source module can transmit the N image source light beams to the light beam deflection module in the K different periodicities based on the received indication message. For example, the image source module may transmit the first image source light beam to the light beam deflection module in the first periodicity, and the image source module may also transmit the second image source light beam to the light beam deflection module in the second periodicity. Specifically, the first processing module included in the image source module can determine the K periodicities based on the received indication message, and control the image source module to transmit the N image source light beams to the light beam deflection module in the K different periodicities. The following describes several optional cases of N image sources:

Case 1

The N image source light beams shown in this case correspond to a same image source. In other words, this case is applied to a scenario in which image sources displayed in the N display areas are the same. For example, as shown in FIG. 2A, a picture or a video that is formed in the first display area 211 and that is viewed by the viewers in the first viewing area 241 is the same as a picture or a video that is formed in the second display area 212 and that is viewed by the viewers in the second viewing area 242.

For example, after obtaining a to-be-displayed image source, the image source module converts the image source into an image source light beam. Specifically, the to-be-displayed image source includes J frames of images, where J is any positive integer greater than or equal to 1. The image source module obtains a first image source light beam and a second image source light beam that correspond to each of the J frames of images. The image source module transmits the first image source light beam and the second image source light beam respectively in two different periodicities. It can be learned that the first image source light beam can form a virtual image in the first display area, and the second image source light beam can form a virtual image in the second display area. In addition, both the first display area and the second display area display the J frames of images.

Case 2

The N image source light beams shown in this case correspond to different image sources. In other words, this case is applied to a scenario in which image sources displayed in the N display areas are different. It can be learned that, based on a same display apparatus shown in this embodiment, different image sources may be displayed in different display areas. For example, as shown in FIG. 2A, a picture or a video viewed by the viewers in the first display area 211 is different from a picture or a video viewed by the viewers in the second display area 212.

For example, the image source module obtains two different to-be-displayed image sources, namely, a first image source and a second image source. The image source module converts the first image source and the second image source into a first image source light beam and a second image source light beam respectively. The image source module transmits the first image source light beam to the light beam deflection module in the first periodicity, and the image source module transmits the second image source light beam to the light beam deflection module in the second periodicity. It can be learned that the first image source light beam can form a virtual image in a first display area, and the second image source light beam can form a virtual image in a second display area. In this case, the different image sources can be displayed in the different display areas.

Step 406: The light beam deflection module deflects transmission directions of the N image source light beams to N imaging areas of the imaging module.

In this embodiment, an example in which K is equal to N and the N image source light beams are respectively transmitted in N different periodicities is used for description. It can be learned that in the example shown in this embodiment, the display apparatus can transmit the image source light beams to N different viewing areas through the N imaging areas of the imaging module. In this embodiment, an example in which a quantity of viewing areas is equal to a quantity of image source light beams and is equal to a quantity of periodicities is used. In another example, the quantity of viewing areas may be less than the quantity of image source light beams, or the quantity of viewing areas may be greater than the quantity of image source light beams. This is not specifically limited.

The light beam deflection module shown in this embodiment deflects the transmission directions of the N image source light beams to the N imaging areas of the imaging module based on the first deflection list and the indication message from the processing unit. It can be learned that the light beam deflection module can deflect N different image source light beams to different transmission directions in K different periodicities, to ensure that the N different image source light beams emitted from the light beam deflection module can be respectively transmitted to the N imaging areas included in the imaging module. Specifically, the second processing module included in the light beam deflection module may determine the K periodicities based on the indication message from the processing unit. The second processing module is further configured to control the light beam deflection module to deflect the transmission directions of the N image source light beams to the N imaging areas of the imaging module in the K periodicities.

For example, the light beam deflection module controls, based on an indication of the first deflection list shown in Table 1, the light beam deflection module to be in the deflection state A1 in the first periodicity indicated by using the indication message. The light beam deflection module is in the deflection state A1, and can emit a first image source light beam from the light beam deflection module at a first emergence angle. The first image source light beam emitted from the light beam deflection module at the first emergence angle may be transmitted to a first imaging area of the imaging module along the first transmission direction. Similarly, the light beam deflection module controls, based on the indication of the first deflection list shown in Table 1, the light beam deflection module to be in the deflection state A2 in the second periodicity indicated by using the indication message. The light beam deflection module is in the deflection state A2, and can emit the second image source light beam from the light beam deflection module at the second emergence angle. The second image source light beam emitted from the light beam deflection module at the second emergence angle may be transmitted to a second imaging area of the imaging module along the second transmission direction.

Step 407: The N imaging areas of the imaging module respectively transmit the N image source light beams to N viewing areas.

In this embodiment, the N imaging areas included in the imaging module are respectively in a one-to-one correspondence with the N viewing areas. The N image source light beams output by the N imaging areas can be respectively transmitted to the N viewing areas. The N image source light beams are transmitted to the N viewing areas to form the virtual images in corresponding N display areas respectively. For descriptions of a specific process of imaging in the N display areas, refer to FIG. 2A or FIG. 2B. It can be learned that the N image source light beams are respectively imaged in the N display areas in the K periodicities. It can be learned that, in different periodicities, different image source light beams can be imaged in different display areas. For example, in the first periodicity, the first image source light beam performs imaging in the first display area, and in the second periodicity, the second image source light beam performs imaging in the second display area.

For example, in the example shown in FIG. 2A, the imaging module 203 has the first imaging area and the second imaging area. The first imaging area receives the first image source light beam transmitted by the light beam deflection module 202 in the first periodicity. The first imaging area can transmit the first image source light beam to the first viewing area 241. The first image source light beam can be imaged in the first display area 211. Similarly, the second imaging area receives the second image source light beam transmitted by the light beam deflection module 202 in the second periodicity. The second imaging area can transmit the second image source light beam to the second viewing area 242. The second image source light beam can be imaged in the second display area 212.

In this embodiment, it can be learned from the example shown in FIG. 2A that the first image source light beam output by the imaging module 203 can be imaged in the first display area 211 in the first periodicity. However, imaging is not performed in the first display area 211 in the second periodicity. Similarly, the second image source light beam output by the imaging module 203 can be imaged in the second display area 212 in the second periodicity. However, imaging is not performed in the second display area 212 in the first periodicity. It can be learned that because the first display area 211 and the second display area 212 are imaged in the different periodicities, the first display area 211 and the second display area 212 do not interfere with each other.

The display apparatus shown in this embodiment can transmit an image source light beam in a plurality of continuous transmission periodicities. The N image source light beams shown above are transmitted in each transmission periodicity. For example, the display apparatus transmits the N image source light beams in a transmission periodicity Ta1, where the N image source light beams are respectively imaged in the N display areas; and the display apparatus transmits the N image source light beams in a transmission periodicity Ta2, where the N image source light beams are respectively imaged in the N display areas. To ensure that the viewers can view continuous image sources in the first viewing area 241, a frame rate between an image source light beam a1 and an image source light beam a2 received by the viewers in the first viewing area 241 is greater than or equal to a preset value. The image source light beam a1 is an image source light beam transmitted by the display apparatus in the transmission periodicity Ta1, and the image source light beam a2 is an image source light beam transmitted by the display apparatus in the transmission periodicity Ta2. When the frame rate between the image source light beam a1 and the image source light beam a2 is greater than or equal to the preset value, the viewers do not sense switching between the image source light beam a1 and the image source light beam a2 in the first viewing area 241. The preset value shown in this embodiment is 30 hertz (Hz).

Figure 1:
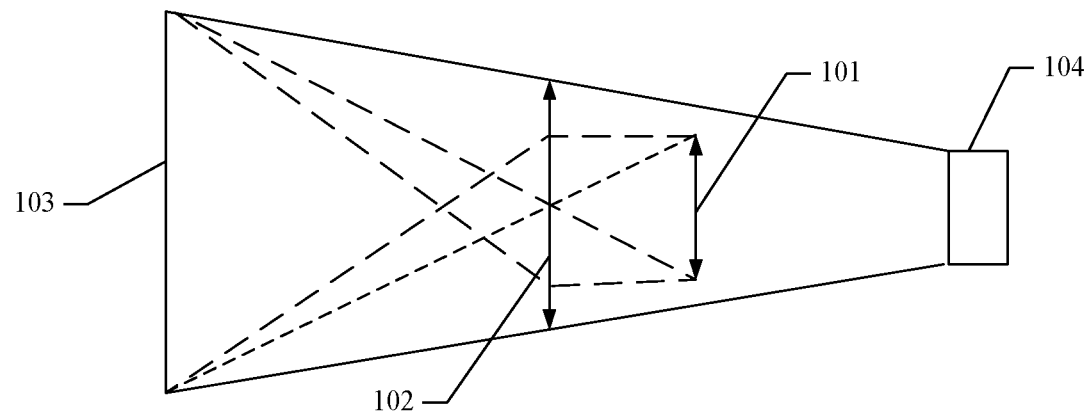
FIG. 1 is an example diagram of a structure of a display apparatus according to a current technology.

As shown in this embodiment, the light beam deflection module can deflect the image source light beams to a plurality of different viewing areas in the K different periodicities. The viewers located in the plurality of different viewing areas can view imaging in the plurality of display areas. In this embodiment, there are the plurality of viewing areas. It can be learned that the display apparatus effectively increases the quantity of viewing areas. For example, in an existing solution shown in FIG. 1, a viewer can view imaging only in a same viewing area. However, in this embodiment, the viewers can view the imaging in the plurality of different viewing areas. In this embodiment, the viewing areas of the viewing image source can be increased by increasing the quantity of viewing areas without increasing an aperture of the imaging module. Because the aperture of the imaging module does not need to be increased, a volume of the display apparatus does not need to be increased, space occupied by the display apparatus is reduced, and a space requirement of the display apparatus is reduced. The display apparatus shown in this embodiment can further support a plurality of viewers in viewing, in the plurality of viewing areas, images formed by the display apparatus in the plurality of display areas.

Embodiment 2

Figure 6:
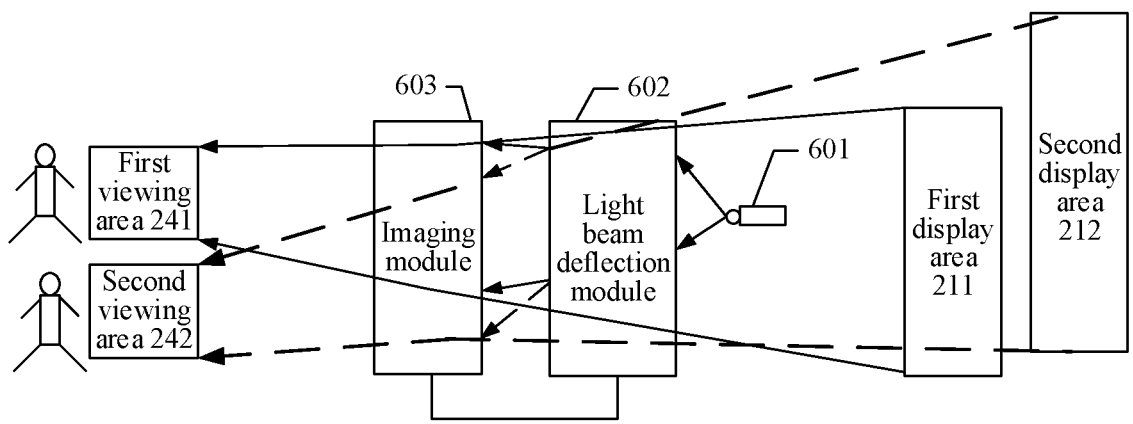
FIG. 6 is an example diagram of a structure of a third embodiment of a display apparatus according to the present disclosure.

A structure of a display apparatus shown in this embodiment is different from the structure of the display apparatus shown in Embodiment 1. Specifically, for the structure of the display apparatus shown in this embodiment, refer to FIG. 6. FIG. 6 is an example diagram of a structure of a third embodiment of a display apparatus according to the present disclosure.

The display apparatus shown in this embodiment includes an image source module 601, a light beam deflection module 602, and an imaging module 603. For specific descriptions of the image source module 601 and the light beam deflection module 602, refer to Embodiment 1. The imaging module 603 shown in this embodiment may include one or more lenses. For specific descriptions, refer to FIG. 2A. The imaging module 603 shown in this embodiment may alternatively include one or more reflectors. For specific descriptions, refer to FIG. 2B. In this embodiment, an example in which the imaging module 603 includes one or more lenses is used for description. In this embodiment, a first processing module included in the image source module 601 is connected to a second processing module included in the light beam deflection module 602. In this way, data exchange can be performed between the image source module 601 and the light beam deflection module 602. For descriptions of the first processing module and the second processing module, refer to Embodiment 1.

Figure 7:
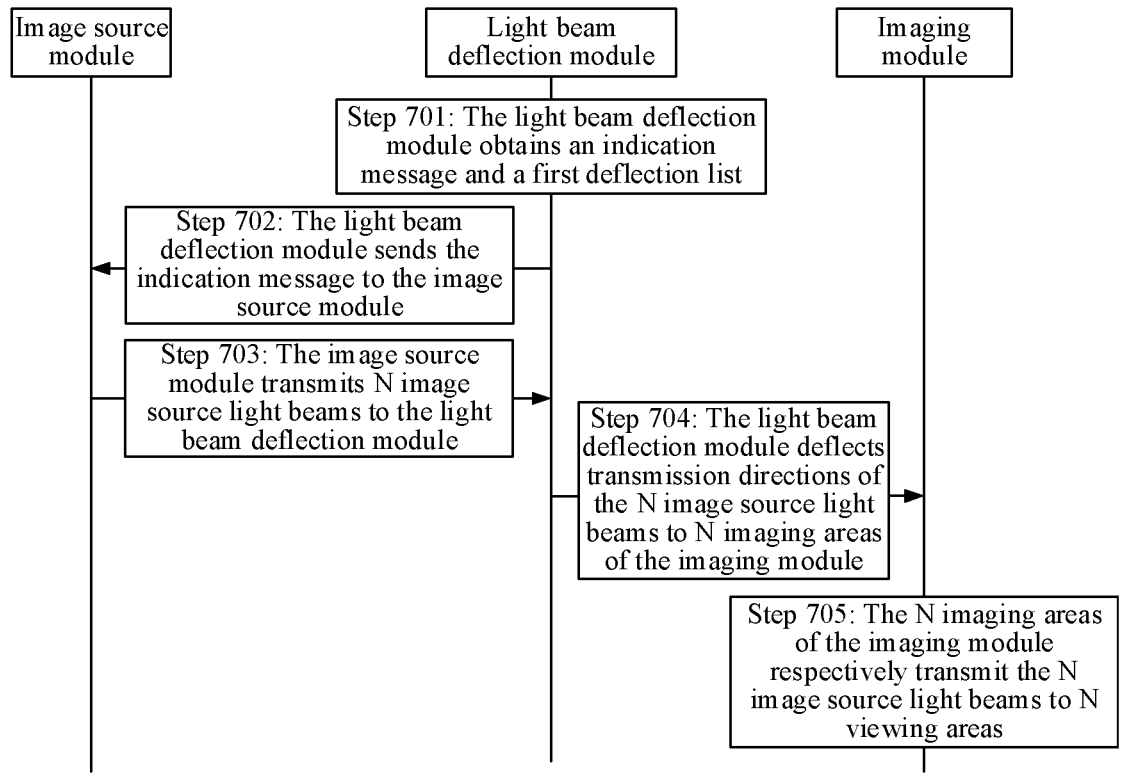
FIG. 7 is a flowchart of steps of a second embodiment of an imaging method according to the present disclosure.

Based on the display apparatus shown in FIG. 6, the following describes an imaging method provided in this embodiment with reference to FIG. 7. FIG. 7 is a flowchart of steps of a second embodiment of an imaging method according to the present disclosure.

Step 701: The light beam deflection module obtains an indication message and a first deflection list.

In this embodiment, the second processing module included in the light beam deflection module is configured to obtain the indication message and the first deflection list. For descriptions of a process in which the second processing module obtains the indication message and the first deflection list, refer to descriptions of the process in which the processing unit obtains the indication message and the first deflection list shown in step 401 and step 402 in Embodiment 1.

Step 702: The light beam deflection module sends the indication message to the image source module.

Specifically, the second processing module included in the light beam deflection module sends the indication message to the first processing module included in the image source module.

Step 703: The image source module transmits N image source light beams to the light beam deflection module.

Step 704: The light beam deflection module deflects transmission directions of the N image source light beams to N imaging areas of the imaging module.

For descriptions of an execution process of step 703 and step 704 shown in this embodiment, refer to step 405 and step 406 shown in FIG. 4. The image source module and the light beam deflection module shown in this embodiment need to synchronously determine K periodicities. Specifically, if the image source module determines that a current moment is in a first periodicity, the light beam deflection module can also determine that the current moment is also in the first periodicity. For example, if the indication message is the same as that in the optional manner 3 shown in Embodiment 1, the image source module and the light beam deflection module can synchronously determine each periodicity. If the indication message is the same as that in the optional manner 1 or 2 shown in Embodiment 1, the light beam deflection module sends a start moment to the image source module. For descriptions of a process in which the image source module and the light beam deflection module synchronously determine the K periodicities based on the start moment, refer to descriptions in Embodiment 1.

Step 705: The N imaging areas of the imaging module respectively transmit the N image source light beams to N viewing areas.

For descriptions of a specific execution process of step 705 shown in this embodiment, refer to step 407 shown in Embodiment 1.

In this embodiment, an example in which the second processing module included in the light beam deflection module sends the indication message to the first processing module included in the image source module is used for description, which is not limited. In another example, for example, the first processing module included in the image source module obtains the first deflection list and the indication message. The first processing module sends the first deflection list and the indication message to the second processing module, to ensure that the light beam deflection module and the image source module can synchronously determine the K periodicities. A specific process is not described again.

For descriptions of beneficial effects shown in this embodiment, refer to Embodiment 1.

Embodiment 3

Figure 8:
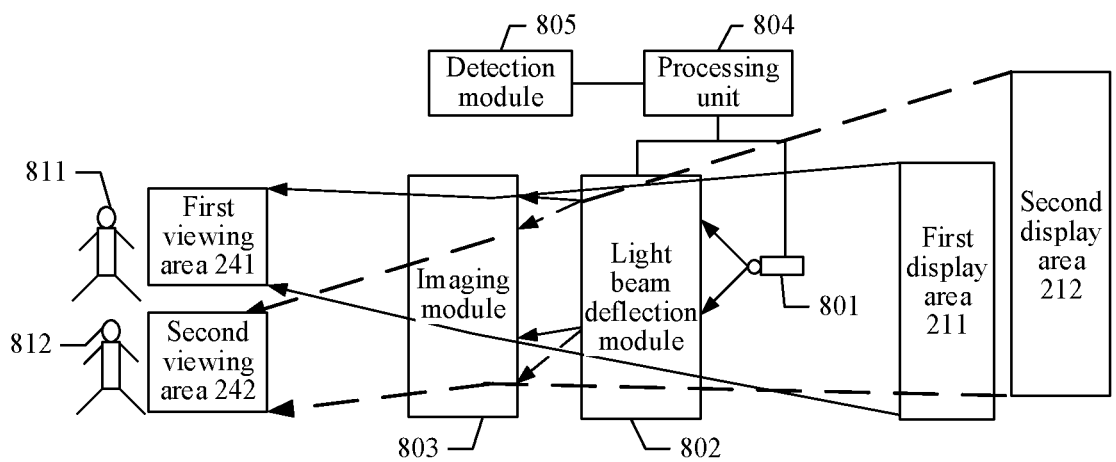
FIG. 8 is an example diagram of a structure of a fourth embodiment of a display apparatus according to the present disclosure.

A structure of a display apparatus shown in this embodiment is different from the structure of the display apparatus shown in Embodiment 1. Specifically, for the structure of the display apparatus shown in this embodiment, refer to FIG. 8. FIG. 8 is an example diagram of a structure of a fourth embodiment of a display apparatus according to the present disclosure.

The display apparatus shown in this embodiment includes an image source module 801, a light beam deflection module 802, and an imaging module 803. For specific descriptions of the image source module 801 and the light beam deflection module 802, refer to Embodiment 1. The imaging module 803 shown in this embodiment may include one or more lenses. For specific descriptions, refer to FIG. 2A. The imaging module 803 shown in this embodiment may alternatively include one or more reflectors. For specific descriptions, refer to FIG. 2B. In this embodiment, an example in which the imaging module 803 includes one or more lenses is used for description. The display apparatus shown in this embodiment further includes a detection module 805 connected to a processing unit 804. The display apparatus shown in this embodiment can perform imaging in N display areas. For descriptions of the N display areas, refer to Embodiment 1. The detection module 805 is configured to detect coordinates of M viewers, where M shown in this embodiment is any positive integer greater than or equal to N. The display apparatus shown in this embodiment can perform imaging in the N display areas based on the coordinates of the M viewers. It can be learned that, in this embodiment, it can be ensured that the M viewers can view, in N viewing areas, images in the N display areas.

Figure 9:
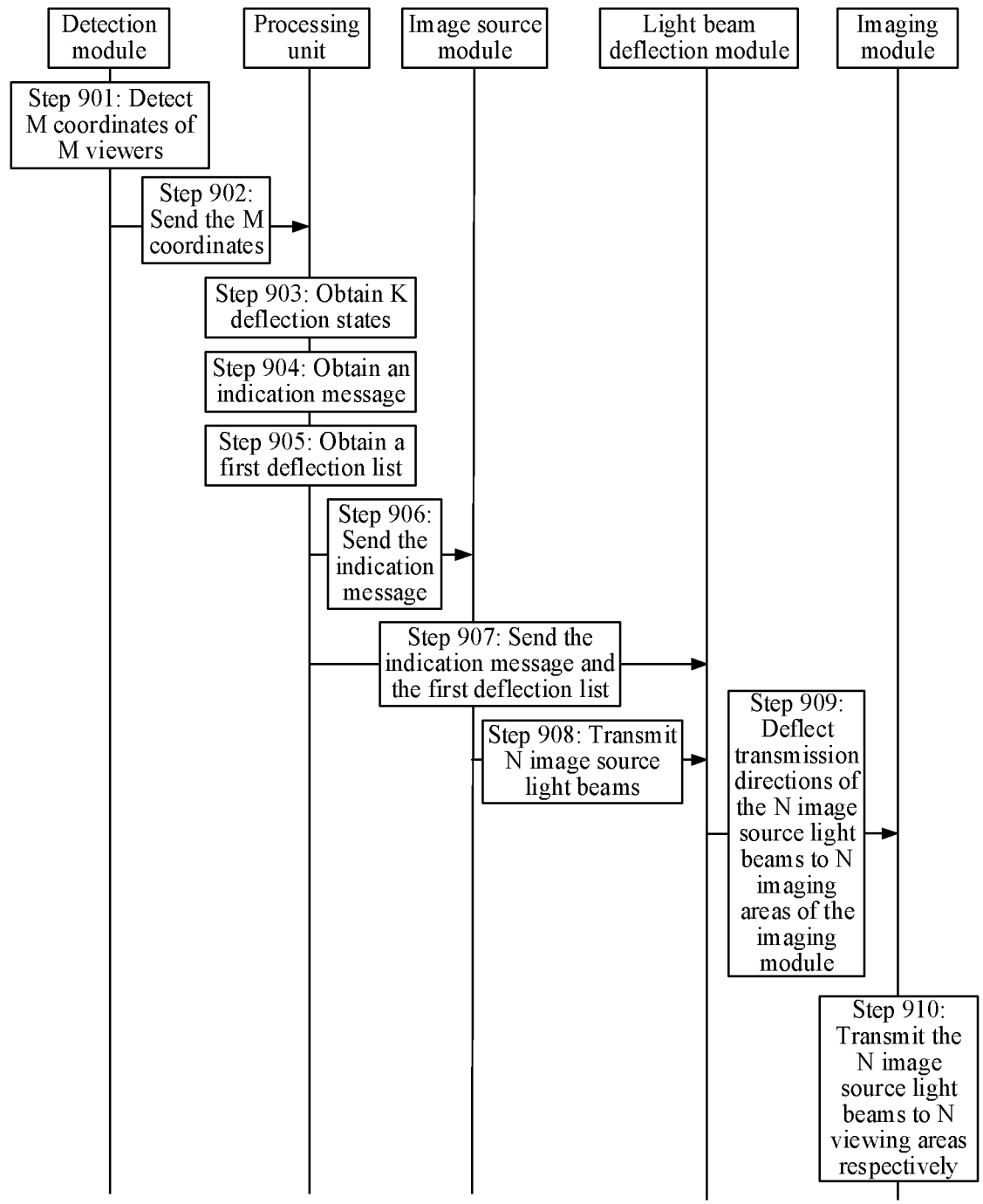
FIG. 9 is a flowchart of steps of a third embodiment of an imaging method according to the present disclosure.

Based on the display apparatus shown in FIG. 8, the following describes an imaging method provided in this embodiment with reference to FIG. 9. FIG. 9 is a flowchart of steps of a third embodiment of an imaging method according to the present disclosure.

Step 901: The detection module detects M coordinates of the M viewers.

As shown in FIG. 8, a value of M is 2. The detection module can detect a coordinate of a first viewer 811 and a coordinate of a second viewer 812. It should be noted that M shown in this embodiment is any positive integer greater than or equal to N. The following describes optional manners in which the detection module detects the coordinates of the M viewers.

Manner 1

The detection module may send detection signals to the viewers. The detection module receives response signals reflected by the viewers. The detection module determines, based on the response signals, the M coordinates respectively corresponding to the M viewers.

Manner 2

The detection module may include a camera array and an image analyzer connected to the camera array. The image analyzer is connected to the processing unit. For descriptions of an implementation of the image analyzer, refer to descriptions of the implementation of the processing unit shown in Embodiment 1. The camera array includes one or more cameras. If the camera array includes a plurality of cameras, different cameras have different photographing ranges. The camera array collects one or more pictures of the viewers that need to view an image source based on the display apparatus. The image analyzer performs image analysis based on the one or more pictures collected by the camera array, to obtain the M coordinates respectively corresponding to the M viewers.

It can be learned that the M coordinates of the M viewers shown in this embodiment are obtained by the detection module. In this case, if a location of one or more of the M viewers moves, the detection module may re-obtain M coordinates of the M viewers. Then, the display apparatus performs imaging again in the N display areas based on the M coordinates obtained after the location moves.

Step 902: The detection module sends the M coordinates to the processing unit.

In this embodiment, an example in which the detection module includes the camera array and the image analyzer is used for description. In another example, the detection module may include only the camera array. The camera array sends the collected one or more pictures to the processing unit, and the processing unit is responsible for obtaining the M coordinates.

Step 903: The processing unit obtains K deflection states based on the M coordinates.

When the processing unit shown in this embodiment obtains the M coordinates, the processing unit obtains the N viewing areas. In this embodiment, the M viewers located in the N viewing areas can view the image source in the N display areas. Still refer to FIG. 8. The processing unit can determine a first viewing area 241 based on the coordinate of the first viewer 811, to ensure that the first viewer 811 can view the image source in the first viewing area 241; and the processing unit can determine a second viewing area 242 based on the coordinate of the second viewer 812, to ensure that the second viewer 812 can view the image source in the second viewing area 242.

When obtaining the N viewing areas, the processing unit determines, in the imaging module, N imaging areas corresponding to the N viewing areas. Image source light beams separately emitted from the N imaging areas can be respectively transmitted to the N viewing areas. For example, the processing unit can determine a first imaging area based on the first viewing area 241, and the image source light beam emitted from the first imaging area can be imaged in a first display area 211; and the processing unit can determine a second imaging area based on the second viewing area 242, and the image source light beam emitted from the second imaging area can be imaged in a second imaging position 212.

The processing unit determines the K deflection states based on the N imaging areas, to ensure that the light beam deflection module can transmit N image source light beams to the N viewing areas in the K deflection states. For descriptions of the deflection states, refer to the descriptions in Embodiment 1. Details are not described in this embodiment. For example, the processing unit obtains a deflection state A1 and a deflection state A2. The light beam deflection module, in the deflection state A1, can transmit the image source light beam to the first imaging area; and the light beam deflection module, in the deflection state A2, can transmit the image source light beam to the second imaging area.

Step 904: The processing unit obtains an indication message.

Step 905: The processing unit obtains a first deflection list.

Step 906: The processing unit sends the indication message to an image source module.

Step 907: The processing unit sends the indication message and the first deflection list to the light beam deflection module.

Step 908: The image source module transmits the N image source light beams to the light beam deflection module.

Step 909: The light beam deflection module deflects transmission directions of the N image source light beams to the N imaging areas of the imaging module.

Step 910: The N imaging areas of the imaging module respectively transmit the N image source light beams to the N viewing areas.

For descriptions of an execution process of step 904 to step 910 shown in this embodiment, refer to step 401 to step 407 shown in Embodiment 1.

For descriptions of beneficial effects shown in this embodiment, refer to Embodiment 1. In this embodiment, corresponding viewing areas can be further determined based on the M coordinates of the M viewers. To be specific, the light beam deflection module can determine the transmission directions of the image source light beams based on the M coordinates of the M viewers, to ensure that the M viewers can view, in the N viewing areas, images formed in the N display areas. In addition, the display apparatus determines the corresponding viewing areas based on the M coordinates of the M viewers. This effectively ensures that all the M viewers can successfully view the images in the N display areas.

Embodiment 4

Figure 10:
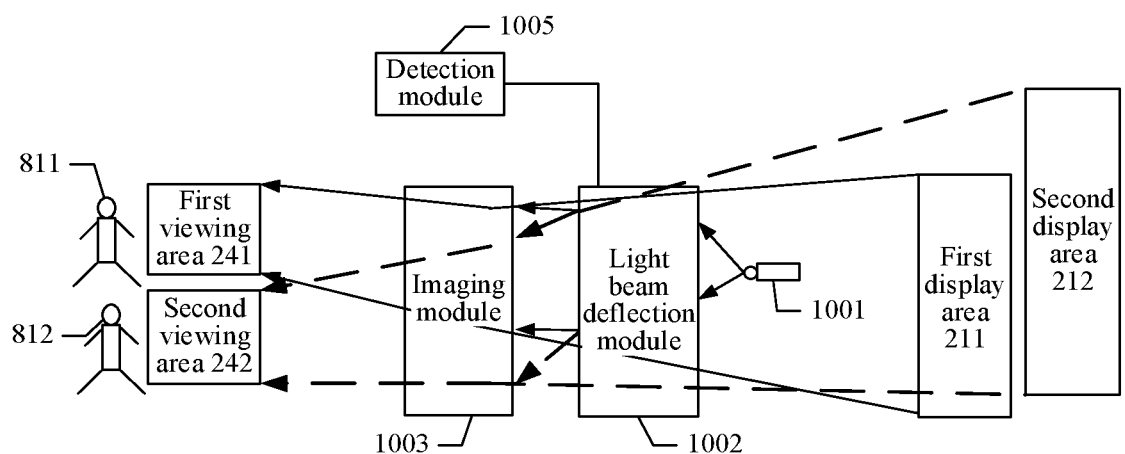
FIG. 10 is an example diagram of a structure of a fifth embodiment of a display apparatus according to the present disclosure.

A structure of a display apparatus shown in this embodiment is different from the structure of the display apparatus shown in Embodiment 1. Specifically, for the structure of the display apparatus shown in this embodiment, refer to FIG. 10. FIG. 10 is an example diagram of a structure of a fifth embodiment of a display apparatus according to the present disclosure.

The display apparatus shown in this embodiment includes an image source module 1001, a light beam deflection module 1002, and an imaging module 1003. The display apparatus further includes a detection module 1005 connected to the light beam deflection module 1002. For specific descriptions of the image source module 1001, the light beam deflection module 1002, the imaging module 1003, and the detection module 1005, refer to Embodiment 3. In this embodiment, a first processing module included in the image source module 1001 is connected a second processing module included in the light beam deflection module 1002. In this way, data exchange can be performed between the image source module 1001 and the light beam deflection module 1002. For descriptions of the first processing module and the second processing module, refer to Embodiment 1.

Figure 11:
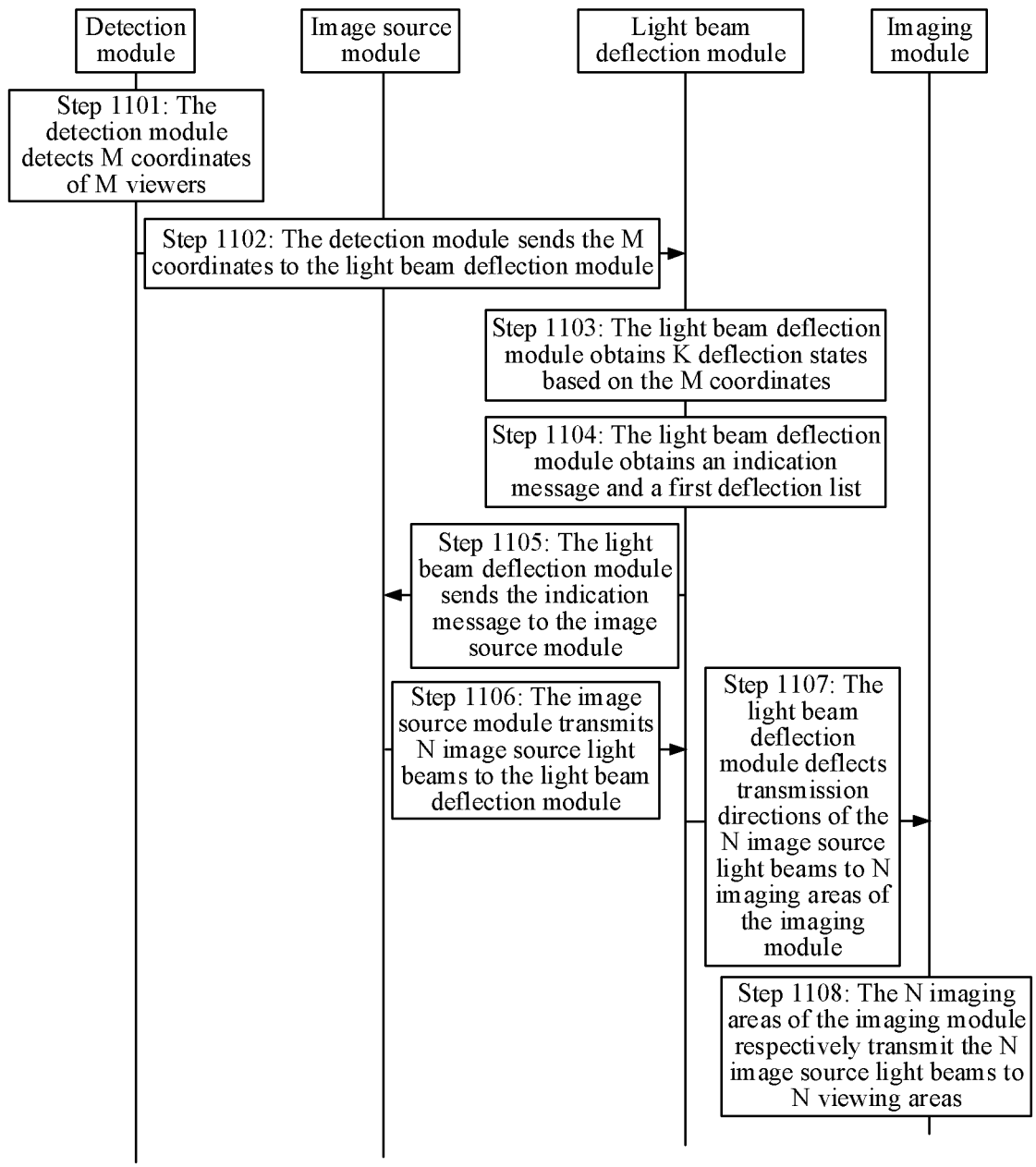
FIG. 11 is a flowchart of steps of a fourth embodiment of an imaging method according to the present disclosure.

Based on the display apparatus shown in FIG. 10, the following describes an imaging method provided in this embodiment with reference to FIG. 11. FIG. 11 is a flowchart of steps of a fourth embodiment of an imaging method according to the present disclosure.

Step 1101: The detection module detects M coordinates of M viewers.

For descriptions of an execution process of step 1101 shown in this embodiment, refer to step 901 shown in Embodiment 3.

Step 1102: The detection module sends the M coordinates to the light beam deflection module.

Specifically, the light beam deflection module includes the second processing module. The second processing module of the light beam deflection module receives the M coordinates from the detection module. For descriptions of the second processing module, refer to Embodiment 1.

Step 1103: The light beam deflection module obtains K deflection states based on the M coordinates.

For descriptions of a process in which the light beam deflection module shown in this embodiment obtains the K deflection states, refer to descriptions of a process in which the processing unit obtains the K deflection states in step 903 shown in Embodiment 3.

Step 1104: The light beam deflection module obtains an indication message and a first deflection list.

For a specific process in which the light beam deflection module obtains the indication message and the first deflection list, refer to step 904 and step 905 shown in Embodiment 3.

Step 1105: The light beam deflection module sends the indication message to the image source module.

The image source module and the light beam deflection module shown in this embodiment synchronously determine K periodicities based on the indication message. Specifically, if the image source module determines that a current moment is in a first periodicity, the light beam deflection module can also determine that the current moment is also in the first periodicity. For example, if the indication message is the same as that in the optional manner 3 shown in Embodiment 1, the image source module and the light beam deflection module can synchronously determine each periodicity. If the indication message is the same as that in the optional manner 1 or 2 shown in Embodiment 1, the light beam deflection module sends a start moment to the image source module. For descriptions of a process in which the image source module and the light beam deflection module synchronously determine the K periodicities based on the start moment, refer to descriptions in Embodiment 1.

Step 1106: The image source module transmits N image source light beams to the light beam deflection module.

Step 1107: The light beam deflection module deflects transmission directions of the N image source light beams to N imaging areas of the imaging module.

Step 1108: The N imaging areas of the imaging module respectively transmit the N image source light beams to N viewing areas.

For descriptions of an execution process of step 1106 to step 1108 shown in this embodiment, refer to step 908 to step 910 shown in Embodiment 3.

In this embodiment, an example in which the second processing module included in the light beam deflection module sends the indication message to the first processing module included in the image source module is used for description, which is not limited. In another example, for example, the first processing module included in the image source module obtains the first deflection list and the indication message based on the M coordinates obtained by the detection module. The first processing module sends the first deflection list and the indication message to the second processing module, to ensure that the light beam deflection module and the image source module can synchronously determine the K periodicities. A specific process is not described again.

For descriptions of beneficial effects shown in this embodiment, refer to Embodiment 3.

Embodiment 5

Figure 12:
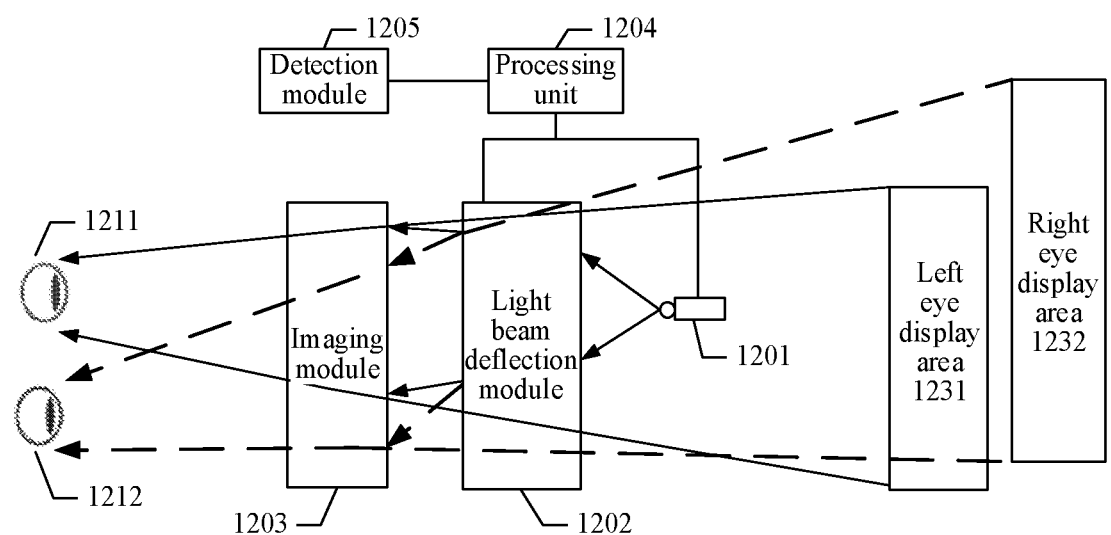
FIG. 12 is an example diagram of a structure of a sixth embodiment of a display apparatus according to the present disclosure.

A display apparatus shown in this embodiment can be applied to the three-dimensional imaging field. Specifically, for a structure of the display apparatus shown in this embodiment, refer to FIG. 12. FIG. 12 is an example diagram of a structure of a sixth embodiment of a display apparatus according to the present disclosure.

The display apparatus shown in this embodiment includes an image source module 1201, a light beam deflection module 1202, an imaging module 1203, a processing unit 1204, and a detection module 1205. For specific descriptions of the image source module 1201, the light beam deflection module 1202, the imaging module 1203, the processing unit 1204, and the detection module 1205, refer to Embodiment 3.

Figure 13:
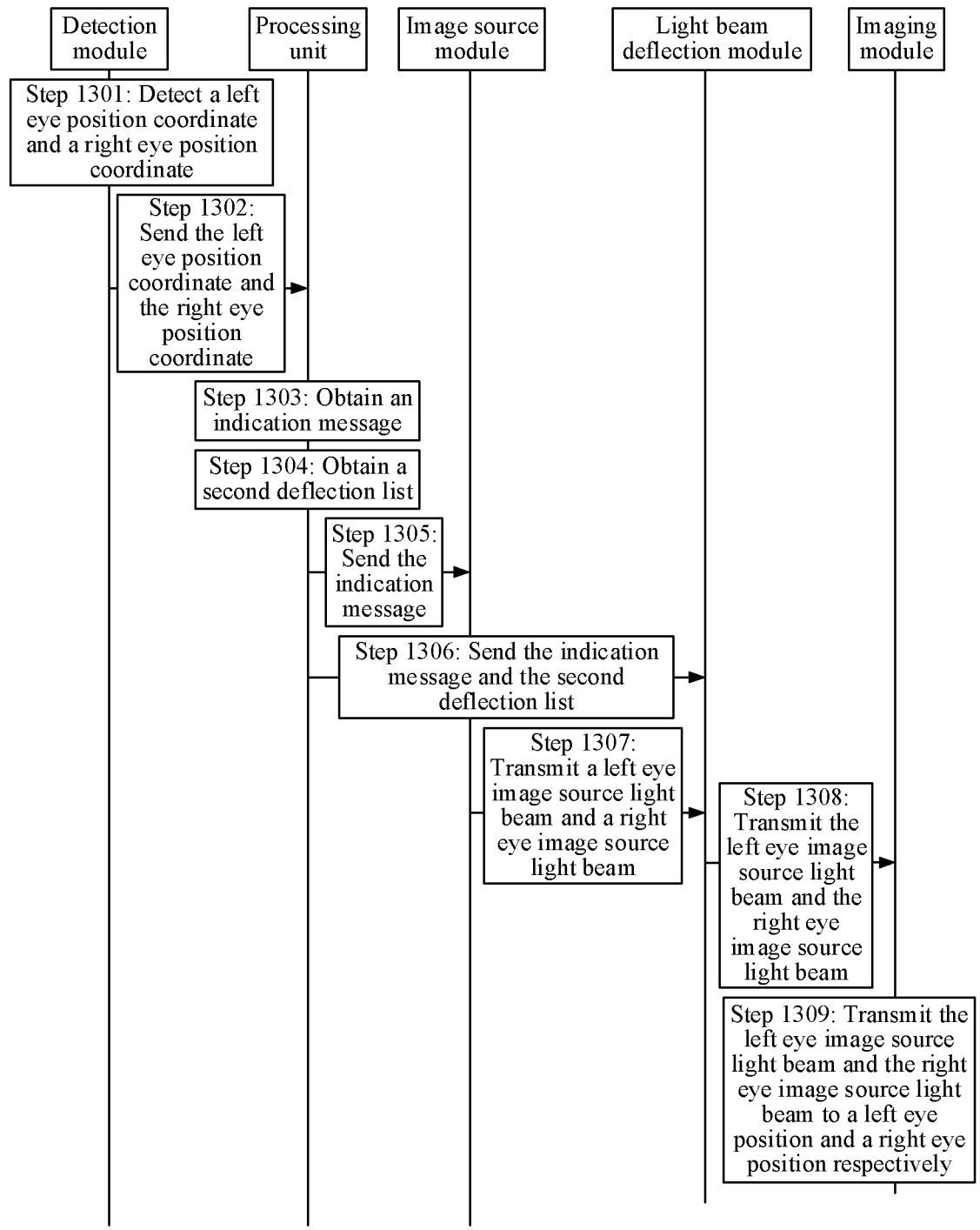
FIG. 13 is a flowchart of steps of a fifth embodiment of an imaging method according to the present disclosure.

Based on the display apparatus shown in FIG. 12, the following describes an imaging method provided in this embodiment with reference to FIG. 13. FIG. 13 is a flowchart of steps of a fifth embodiment of an imaging method according to the present disclosure.

Step 1301: The detection module detects a left eye position coordinate and a right eye position coordinate.

The left eye position coordinate and the right eye position coordinate are a coordinate corresponding to a left eye and a coordinate corresponding to a right eye of a same viewer. As shown in FIG. 12, the detection module 1205 can detect the left eye position coordinate of a left eye 1211. The detection module 1205 can further detect the right eye position coordinate of a right eye 1212. The left eye 1211 and the right eye 1212 belong to the same viewer. For descriptions of a process of detecting coordinates by the detection module, refer to descriptions of a process of detecting coordinates shown in Embodiment 3.

Step 1302: The detection module sends the left eye position coordinate and the right eye position coordinate to the processing unit.

Step 1303: The processing unit obtains an indication message.

To implement three-dimensional imaging on the viewer, the indication message determined by the processing unit indicates two periodicities. In the two periodicities, a first periodicity is used for transmitting a left eye image source light beam, and a second periodicity is used for transmitting a right eye image source light beam. For a specific process of obtaining the indication message by the processing unit, refer to step 401 shown in Embodiment 1.

An execution time sequence between step 1302 and step 1303 is not limited in this embodiment.

Step 1304: The processing unit obtains a second deflection list based on the left eye position coordinate and the right eye position coordinate.

The second deflection list shown in this embodiment includes a one-to-one correspondence between the two different periodicities and two different deflection states. The second deflection list indicates the light beam deflection module, and if the left eye image source light beam needs to be transmitted to a left eye position in the first periodicity, the light beam deflection module needs to be in a corresponding deflection state, to ensure that the left eye image source light beam output by the light beam deflection module can be transmitted to the left eye position in the first periodicity. Similarly, if the right eye image source light beam needs to be transmitted to a right eye position in the second periodicity, the light beam deflection module needs to be under corresponding control, to ensure that the right eye image source light beam output by the light beam deflection module can be transmitted to the right eye position in the second periodicity. For example, refer to the following Table 2:

TABLE 2

| Deflection state | Periodicity |
|---|---|
| Left eye deflection state B1 | First periodicity |
| Right eye deflection state B2 | Second periodicity |

For descriptions of a left eye deflection state and a right eye deflection state, refer to descriptions of the deflection state in Embodiment 1. It can be learned that, if the light beam deflection module is a tunable liquid crystal grating, the left eye deflection state or the right eye deflection state may be different voltage signals or current signals input to the light beam deflection module. It can be learned that, in the first periodicity, the light beam deflection module is in the left eye deflection state, and can transmit the left eye image source light beam to the left eye position; and in the second periodicity, the light beam deflection module is in the right eye deflection state, and can transmit the right eye image source light beam to the right eye position.

Based on the second deflection list shown in this embodiment, it can be ensured that the left eye and the right eye of the viewer can view a three-dimensional image. Specifically, the left eye 1211 needs to be able to view a virtual image formed by the left eye image source light beam in a left eye display area 1231, and the right eye 1212 needs to be able to view a virtual image formed by the right eye image source light beam in a right eye display area 1232. The left eye image source light beam is a light beam generated by the image source module based on a left eye disparity map, and the right eye image source light beam is a light beam generated by the image source module based on a right eye disparity map. The left eye disparity map and the right eye disparity map correspond to a same three-dimensional image source. The brain of the viewer combines the virtual image formed by the left eye image source light beam and the virtual image formed by the right eye image source light beam, to obtain the three-dimensional image. The left eye disparity map and the right eye disparity map shown in this embodiment may be generated based on a binocular stereopsis imaging technology. The left eye disparity map and the right eye disparity map shown in this example may be generated based on a grating stereoscopic imaging technology. In this example, the viewer can view the three-dimensional image without wearing an auxiliary apparatus.

When obtaining the left eye position coordinate and the right eye position coordinate, the processing unit determines, in the imaging module, a left eye imaging area corresponding to the left eye position and a right eye imaging area corresponding to the right eye position. The left eye image source light beam emitted from the left eye imaging area can be transmitted to the left eye position, and the right eye image source light beam emitted from the right eye imaging area can be transmitted to the right eye position. The processing unit separately determines the left eye deflection state and the right eye deflection state based on the left eye imaging area and the right eye imaging area, to ensure that the light beam deflection module, in the left eye deflection state, can transmit the left eye image source light beam to the left eye imaging area; and the light beam deflection module, in the right eye deflection state, can transmit the right eye image source light beam to the right eye imaging area. For descriptions of the deflection states, refer to the descriptions in Embodiment 1. Details are not described in this embodiment.

Step 1305: The processing unit sends the indication message to the image source module.

Step 1306: The processing unit sends the indication message and the second deflection list to the light beam deflection module.

For descriptions of an execution process of step 1305 and step 1306 shown in this embodiment, refer to step 403 and step 404 shown in Embodiment 1.

In this embodiment, an example in which the processing unit determines the indication message and the second deflection list is used for description, and this is not limited. In another example, the indication message and the second deflection list may alternatively be obtained the image source module, or the indication message and the second deflection list may be obtained the light beam deflection module.

Step 1307: The image source module transmits the left eye image source light beam and the right eye image source light beam to the light beam deflection module.

In this embodiment, the image source module can transmit, based on the received indication message, the left eye image source light beam and the right eye image source light beam to the light beam deflection module in the two different periodicities. For example, the image source module may transmit the left eye image source light beam to the light beam deflection module in the first periodicity, and the image source module may also transmit the right eye image source light beam to the light beam deflection module in the second periodicity. Specifically, a first processing module included in the image source module can determine the first periodicity and the second periodicity based on the received indication message, and control the image source module to transmit the left eye image source light beam and the right eye image source light beam to the light beam deflection module in the first periodicity and the second periodicity.

Specifically, the image source module shown in this embodiment obtains the three-dimensional image source. The image source module may receive the three-dimensional image source through an external interface. The image source module may further receive the three-dimensional image source from the processing unit through an internal interface. For descriptions of the external interface and the internal interface, refer to the descriptions in Embodiment 1. The image source module obtains the left eye disparity map and the right eye disparity map that correspond to the three-dimensional image source. The image source module converts the left eye disparity map into the left eye image source light beam in the first periodicity and transmits the left eye image source light beam to the light beam deflection module; and the image source module converts the right eye disparity map into the right eye disparity map in the second periodicity and transmits the right eye disparity map to the light beam deflection module.

Step 1308: The light beam deflection module transmits the left eye image source light beam and the right eye image source light beam to the left eye imaging area and the right eye imaging area respectively.

The light beam deflection module shown in this embodiment deflects the left eye image source light beam and the right eye image source light beam to different transmission directions respectively in different first periodicities and second periodicities based on the second deflection list and the indication message that are from the processing unit. The light beam deflection module may deflect a transmission direction of the left eye image source light beam to the left eye imaging area of the imaging module, to ensure that the left eye image source light beam can be transmitted to the left eye imaging area. The light beam deflection module can further deflect a transmission direction of the right eye image source light beam to the right eye imaging area of the imaging module based on the second deflection list and the indication message, to ensure that the right eye image source light beam can be transmitted to the right eye imaging area. For example, the light beam deflection module controls, based on an indication of the second deflection list shown in Table 2, the light beam deflection module to be in the left eye deflection state B1 in the first periodicity indicated by using the indication message. The light beam deflection module, in the deflection state B1, can emit the left eye image source light beam from the light beam deflection module at a first emergence angle. The left eye image source light beam emitted from the light beam deflection module at the first emergence angle may be transmitted to the left eye imaging area of the imaging module along a first transmission direction. Similarly, the light beam deflection module controls, based on the indication of the second deflection list shown in Table 2, the light beam deflection module to be in the deflection state B2 in the second periodicity indicated by using the indication message. The light beam deflection module, in the deflection state B2, can emit the right eye image source light beam from the light beam deflection module at a second emergence angle. The right eye image source light beam emitted from the light beam deflection module at the second emergence angle may be transmitted to the right eye imaging area of the imaging module along a second transmission direction.

Step 1309: The imaging module transmits the left eye image source light beam and the right eye image source light beam to the left eye position and the right eye position respectively.

In this embodiment, the left eye imaging area included in the imaging module corresponds to the left eye position; and the right eye imaging area included in the imaging module corresponds to the right eye position. The left eye imaging area of the imaging module transmits the left eye image source light beam to the left eye position; and the right eye imaging area of the imaging module transmits the right eye image source light beam to the right eye position. It can be learned that the left eye image source light beam output by the light beam deflection module in the first periodicity can be imaged in the left eye display area 1231, and the right eye image source light beam output by the light beam deflection module in the second periodicity can be imaged in the right eye display area 1232. The left eye of the viewer can view, in the left eye display area 1231, the virtual image formed by the left eye image source light beam, and the right eye of the viewer can view, in the right eye display area 1232, the virtual image formed by the right eye image source light beam. The viewer can view the three-dimensional image based on the virtual image formed in the left eye position and the virtual image formed in the right eye position. It can be learned that the display apparatus shown in this embodiment can implement three-dimensional imaging based on a virtual imaging technology.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. A method, implemented by a display apparatus, the method comprising:

generating an indication message comprising K consecutive bit sets, wherein each bit set in the K consecutive bit sets corresponds to a period in K periodicities and indicates a start time and end time of the period, and wherein K is a second positive integer greater than or equal to 1;

transmitting, by an image source of the display apparatus, N image source light beams to a light beam deflector in the K periodicities based on the indication message, wherein N is a first positive integer greater than or equal to 2;

deflecting, by the light beam deflector, transmission directions of the N image source light beams to a plurality of viewing areas based on the indication message, wherein the indication message indicates to the light beam deflector and the image source to process a same image source light beam in the N image source light beams during a same periodicity of the K periodicities; and respectively imaging, in a plurality of display areas, the N image source light beams transmitted to the plurality of viewing areas.

2. The method of claim 1, wherein deflecting, by the light beam deflector, the transmission directions of the N image source light beams to the plurality of viewing areas comprises:

obtaining, by the light beam deflector, a plurality of deflection states corresponding to the K periodicities; and transmitting, by the light beam deflector, the N image source light beams to the plurality of viewing areas, wherein for each periodicity in the K periodicities, the light beam deflector is in a different deflection states.

3. The method of claim 2, wherein before deflecting, by the light beam deflector, the transmission directions of the N image source light beams to the plurality of viewing areas, the method further comprises:

detecting, by a detector of the display apparatus, M coordinates of M viewers, wherein M is a third positive integer greater than or equal to N;

determining, by a processing unit of the display apparatus, the plurality of deflection states based on the M coordinates; and sending, by the processing unit, the plurality of deflection states to the light beam deflector.

4. The method of claim 2, wherein before deflecting, by the light beam deflector, the transmission directions of the N image source light beams to the plurality of viewing areas, the method further comprises:

detecting, by a detector of the display apparatus, M coordinates of M viewers, wherein M is a third positive integer greater than or equal to N; and determining, by the light beam deflector, the plurality of deflection states based on the M coordinates.

5. The method of claim 1, further comprising synchronously sending, by a processing unit of the display apparatus, the indication message to the image source and the light beam deflector, wherein the indication message indicates the K periodicities.

6. The method of claim 1, wherein before transmitting, by the image source, the N image source light beams to the light beam deflector, the method further comprises sending, by the light beam deflector, the indication message to the image source, wherein the indication message indicates to the light beam deflector and the image source to synchronously determine each periodicity based on the indication message.

7. The method of claim 1, wherein before transmitting, by the image source, the N image source light beams to the light beam deflector, the method further comprises sending, by the image source, the indication message to the light beam deflector, and wherein the indication message indicates to the light beam deflector and the image source to synchronously determine each periodicity based on the indication message.

8. The method of claim 1, wherein each bit set comprises at least one bit.

9. The method of claim 1, wherein each bit set in the K consecutive bit sets comprises values that are different from other bit sets in the K consecutive bit sets.

10. A display apparatus comprising:

an image source configured to transmit N image source light beams in K periodicities, wherein N is a positive integer greater than or equal to 2, and K is a positive integer greater than or equal to 1;

a light beam deflector disposed on transmission optical paths of the N image source light beams transmitted by the image source, wherein the light beam deflector is configured to deflect transmission directions of the N image source light beams to a plurality of viewing areas, and wherein the N image source light beams transmitted to the plurality of viewing areas are respectively imaged in a plurality of display areas; and a processor separately connected to the light beam deflector and the image source, wherein the processor is configured to generate indication message comprising K consecutive bit sets, wherein each bit set in the K consecutive bit sets corresponds to a period in the K periodicities and indicates a start time and end time of the period, and wherein the indication message indicates to the light beam deflector and the image source to process a same image source light beam in the N image source light beams during a same periodicity of the K periodicities.

11. The display apparatus of claim 10, further comprising an imager, wherein a distance between the imager and the image source is less than a focal length of the imager.

12. The display apparatus of claim 10, wherein the light beam deflector is further configured to:

obtain a plurality of deflection states; and transmit the N image source light beams to the plurality of viewing areas, wherein in the K periodicities, the light beam deflector is in different deflection states.

13. The display apparatus of claim 12, further comprising:

a detector configured to detect M coordinates of M viewers, wherein M is a positive integer greater than or equal to N; and wherein the processor is further configured to:

determine the plurality of deflection states based on the M coordinates, and send the plurality of deflection states to the light beam deflector.

14. The display apparatus of claim 12, further comprising a detector coupled to the light beam deflector, wherein the detector is configured to detect M coordinates of M viewers, wherein M is a positive integer greater than or equal to N, and wherein the light beam deflector is further configured to determine the plurality of deflection states based on the M coordinates.

15. The display apparatus of claim 10, wherein the processor is further configured to synchronously send the indication message to the image source and the light beam deflector.

16. A vehicle comprising:

a display apparatus, wherein the display apparatus comprises:

an image source configured to transmit N image source light beams in K periodicities, wherein N is a positive integer greater than or equal to 2, and K is a positive integer greater than or equal to 1;

a light beam deflector disposed on transmission optical paths of the N image source light beams transmitted by the image source, wherein the light beam deflector is configured to deflect transmission directions of the N image source light beams to a plurality of viewing areas, and wherein the N image source light beams transmitted to the plurality of viewing areas are respectively imaged in a plurality of display areas; and processor separately connected to the light beam deflector and the image source, wherein the processor is configured to generate indication message comprising K consecutive bit sets, wherein each bit set in the K consecutive bit sets corresponds to a period in the K periodicities and indicates a start time and end time of the period, and wherein the indication message indicates to the light beam deflector and the image source to process a same image source light beam in the N image source light beams during a same periodicity of the K periodicities.

17. The vehicle of claim 16, wherein the display apparatus further comprises an imager, wherein a distance between the imager and the image source is less than a focal length of the imager.

18. The vehicle of claim 16, wherein the light beam deflector is further configured to:

obtain a plurality of deflection states; and transmit the N image source light beams to the plurality of viewing areas, wherein in the K periodicities, the light beam deflector is in different deflection states.

19. The vehicle of claim 18, wherein the display apparatus further comprises:

a detector configured to detect M coordinates of M viewers, wherein M is a positive integer greater than or equal to N; and wherein the processor is further configured to:

determine the plurality of deflection states based on the M coordinates, and send the plurality of deflection states to the light beam deflector.

20. The vehicle of claim 18, wherein the display apparatus further comprises a detector coupled to the light beam deflector, wherein the detector is configured to detect M coordinates of M viewers, wherein M is a positive integer greater than or equal to N, and wherein the light beam deflector is further configured to determine the plurality of deflection states based on the M coordinates.

\* \* \* \* \*